(12) United States Patent
Chun et al.

(10) Patent No.: US 11,330,499 B2
(45) Date of Patent: May 10, 2022

(54) ACCESS CONTROL METHOD AND USER EQUIPMENT

(71) Applicant: LG ELECTRONICS INC., Seoul (KR)

(72) Inventors: Sungduck Chun, Seoul (KR); Jaehyun Kim, Seoul (KR); Sangmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 16/637,732

(22) PCT Filed: Aug. 8, 2018

(86) PCT No.: PCT/KR2018/009002
§ 371 (c)(1),
(2) Date: Feb. 7, 2020

(87) PCT Pub. No.: WO2019/031831
PCT Pub. Date: Feb. 14, 2019

(65) Prior Publication Data
US 2020/0187088 A1    Jun. 11, 2020

Related U.S. Application Data

(60) Provisional application No. 62/542,336, filed on Aug. 8, 2017.

(51) Int. Cl.
*H04W 48/02* (2009.01)
*H04W 76/27* (2018.01)
(Continued)

(52) U.S. Cl.
CPC ........... *H04W 48/02* (2013.01); *H04L 69/322* (2013.01); *H04W 48/14* (2013.01); *H04W 76/10* (2018.02); *H04W 76/27* (2018.02)

(58) Field of Classification Search
CPC ..... H04W 48/02; H04W 76/27; H04W 76/10; H04W 48/14; H04W 76/12; H04W 48/12; H04L 69/322
See application file for complete search history.

(56) References Cited

U.S. PATENT DOCUMENTS

| 9,326,311 B2 | 4/2016 | Wirtanen et al. |
| 2019/0174561 A1* | 6/2019 | Sivavakeesar ........ H04W 48/12 |
| 2019/0364495 A1* | 11/2019 | Mildh .................. H04W 48/18 |

FOREIGN PATENT DOCUMENTS

| KR | 1020130086049 | 7/2013 |
| KR | 1020140045972 | 4/2014 |

(Continued)

OTHER PUBLICATIONS

PCT International Application No. PCT/KR2018/009002, Written Opinion of the International Searching Authority dated Nov. 26, 2018, 18 pages.

(Continued)

*Primary Examiner* — Diane D Mizrahi
(74) *Attorney, Agent, or Firm* — Lee Hong Degerman Kang Waimey

(57) ABSTRACT

In a wireless communication system of the present disclosure, when activation of a protocol data unit (PDU) session of a user equipment (UE) is needed, the UE performs an access control check to determine whether an access attempt for the PDU session is allowed. If the access attempt is allowed, the UE transmits a service request for the PDU session. The access control check for the PDU session is performed even if the UE is in a connected state.

16 Claims, 12 Drawing Sheets

(a) UE-P-GW user plane with E-UTRAN (b) Control Plane UE-MME

(51) Int. Cl.
*H04W 76/10* (2018.01)
*H04L 29/08* (2006.01)
*H04W 48/14* (2009.01)
*H04L 69/322* (2022.01)

(56) References Cited

FOREIGN PATENT DOCUMENTS

| | | |
|---|---|---|
| KR | 1020150115003 | 10/2015 |
| KR | 1020160032024 | 3/2016 |
| WO | 2016208950 | 12/2016 |
| WO | 2017030343 | 2/2017 |

OTHER PUBLICATIONS

Nokia, et al., "Access Barring in NG-RAN", 3GPP TSG RAN WG2 NR Adhoc #2, R2-1706983, Jun. 2017, 3 pages.
Samsung, "NR access control", 3GPP TSG RAN WG2 Meeting NR #2, R2-1706818, Jun. 2017, 3 pages.

* cited by examiner (a) UE-P-GW user plane with E-UTRAN (b) Control Plane UE-MME (a)

(b)

(a)

(b)

ACCESS CONTROL METHOD AND USER EQUIPMENT

CROSS-REFERENCE TO RELATED APPLICATIONS

This application is the National Stage filing under 35 U.S.C. 371 of International Application No. PCT/KR2018/009002, filed on Aug. 8, 2018, which claims the benefit of U.S. Provisional Application No. 62/542,336, filed on Aug. 8, 2017, the contents of which are all hereby incorporated by reference herein in their entirety.

TECHNICAL FIELD

The present disclosure relates to a wireless communication system and, more particularly, to a method and apparatus for controlling access to a network.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services at anytime and anywhere by connecting a plurality of devices and objects to each other is one main issue to be considered in next generation communication. Further, a communication system to be designed in consideration of a service/UE sensitive to reliability and standby time is under discussion. Introduction of next generation radio access technology has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of smart devices, a new method for efficiently transmitting/receiving small volumes of data or efficiently transmitting/receiving less frequently generated data is required.

In addition, in a system supporting new radio access technology, a method of efficiently controlling access to a network by a UE is required.

The technical objects that can be achieved through the present disclosure are not limited to what has been particularly described hereinabove and other technical objects not described herein will be more clearly understood by persons skilled in the art from the following detailed description.

Technical Solution

According to an aspect of the present disclosure, provided herein is a method of controlling access to a network by a user equipment (UE) in a wireless communication system. The method comprises: performing an access control check for determining whether an access attempt for a protocol data unit (PDU) session is allowed, when the UE is in a connected state and activation of the PDU session of the UE is required. The UE may transmit a service request for the PDU session, when the access attempt is allowed.

According to another aspect of the present disclosure, provided herein is a user equipment (UE) for controlling access to a network in a wireless communication system. The UE includes a transceiver, and a processor configured to control the transceiver. The processor may be configured to perform an access control check for determining whether an access attempt for a protocol data unit (PDU) session is allowed, when the UE is in a connected state and activation of the PDU session of the UE is required. The processor may be configured to control the transceiver to transmit a service request for the PDU session, when the access attempt is allowed.

In each aspect of the present disclosure, the access control check for the PDU session may be performed by a radio access control (RRC) layer of the UE.

In each aspect of the present disclosure, a non-access stratum (NAS) layer of the UE may provide an access category of the PDU session to the RRC layer for the access control check.

In each aspect of the present disclosure, a non-access stratum (NAS) layer of the UE may request that the RRC layer transmit the service request for the PDU session to the network, when the RRC layer informs the NAS layer that the access attempt is allowed.

In each aspect of the present disclosure, the service request for the PDU session may not be transmitted to the network, when the RRC layer informs a non-access stratum (NAS) layer of the UE that the access attempt is barred.

In each aspect of the present disclosure, the service request may be encapsulated in a radio access control (RRC) message to be transmitted.

In each aspect of the present disclosure, the access control check for the PDU session may be performed even in a state in which the UE has at least one activated PDU session.

The above technical solutions are merely some parts of the examples of the present disclosure and various examples into which the technical features of the present disclosure are incorporated can be derived and understood by persons skilled in the art from the following detailed description of the present disclosure.

Advantageous Effects

According to the present disclosure, access to a network by UEs may be efficiently controlled.

According to the present disclosure, uplink/downlink signals can be efficiently transmitted/received. Therefore, overall throughput of a radio communication system can be improved.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate examples of the disclosure and together with the description serve to explain the principle of the disclosure.

MODE FOR CARRYING OUT THE DISCLOSURE

Figure 1:
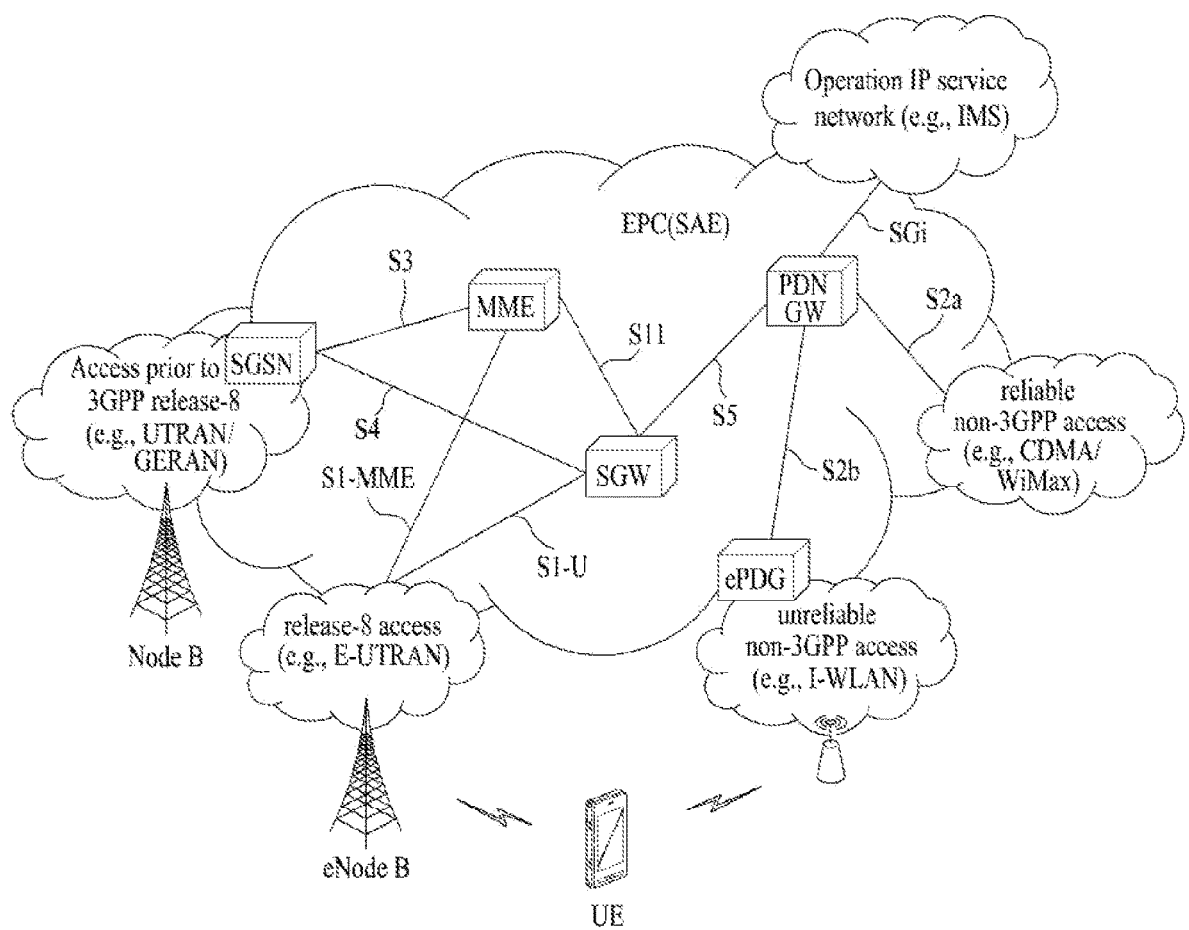
FIG. 1 is a schematic diagram showing the structure of an evolved packet system (EPS) including an evolved packet core (EPC).

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The examples of the present disclosure described hereinbelow are combinations of elements and features of the present disclosure. The elements or features may be considered selective unless mentioned otherwise. Each element or feature may be practiced without being combined with other elements or features. Further, some examples of the present disclosure may be constructed by combining parts of the elements and/or features. Operation orders described in examples of the present disclosure may be rearranged. Some constructions or features of any one example may be included in another example and may be replaced with corresponding constructions or features of another example.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

The examples of the present disclosure can be supported by standard specifications disclosed for at least one of wireless access systems including an institute of electrical and electronics engineers (IEEE) 802.xx, a 3rd generation partnership project (3GPP) system, a 3GPP Long Term Evolution (LTE) system, and a 3GPP2 system. That is, steps or parts that are not described to clarify the technical features of the present disclosure may be explained with reference to the above standard specifications.

All terms disclose in the present specification are explained by the standard specifications. For example, in the present specification may be supported by one or more of 3GPP LTE standard specifications of 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, and 3GPP TS 24.301, 3GPP TS 23.228, 3GPP TS 29.228, 3GPP TS 23.218, 3GPP TS 22.001, 3GPP TS 36.413, 3GPP TS 23.303, and the like.

Reference will now be made in detail to the examples of the present disclosure with reference to the accompanying drawings. The detailed description, which will be given below with reference to the accompanying drawings, is intended to explain exemplary examples of the present disclosure, rather than to show the only examples that can be implemented according to the disclosure.

Specific terms used for the examples of the present disclosure are provided to aid in understanding of the present disclosure. These specific terms may be replaced with other terms within the scope and spirit of the present disclosure.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS (Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP').

GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

gNB: A node that provides protocol termination of an NR user plane and a control plane toward a UE and is connected to a 5G core network (5GC) through a next generation (NG) interface (e.g., NG-C and NG-U).

5G core network (5GC): A core network connected to a 5G access network.

5G access network: An access network including 5G radio access network (5G-RAN) and/or non-5G access network (non-5G-AN) connecting to a 5G core network. The 5G-RAN may be referred to as a new generation access network (NG-RAN).

5G radio access network (5G-RAN) (or RAN): A radio access network that supports one or more of the following options with the common characteristics that it connects to 5GC: standalone new radio, new radio which is the anchor with enhanced E-UTRA expansions, standalone E-UTRA (e.g., eNB), and/or E-UTRA which is anchor with new radio expansions.

Network function (NF) service: Functionality exposed by a network function (NF) through a service-based interface and consumed by other authorized NFs.

5G System: A 3GPP system consisting of a 5G access network (AN), a 5G core network, and a UE. This is also referred to as a new radio (NR) system or a next generation system.

Network slice: A logical network that provides specific network capability(s) and network characteristic(s).

Network slice instance: A set of NF instance(s) and the required resources (e.g. compute, storage and networking resources) which form a deployed network slice.

Packet data unit (PDU) connectivity service: A service that provides exchange of PDU(s) between a UE and a data network.

PDU session: Association between a UE and a data network that provides PDU connectivity service. An association type may be an Internet protocol (IP) type, an Ethernet type, or an unstructured type.

Non-Access Stratum (NAS): A functional layer for transmitting and receiving signaling and traffic messages between a UE and a core network in an EPS and 5G system (5GS) protocol stack and for supporting mobility of the UE and supporting a session management procedure of the UE, IP address management, and so on.

NGAP UE association: The logical per UE association between a 5G-AN and an access and mobility management function (AMF).

NG-RAN: Radio access network of 5G system.

NG-C: Control plane interface between NG-RAN and 5GC.

NG-U: User plane interface between NG-RAN and 5GC.

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Figure 2:
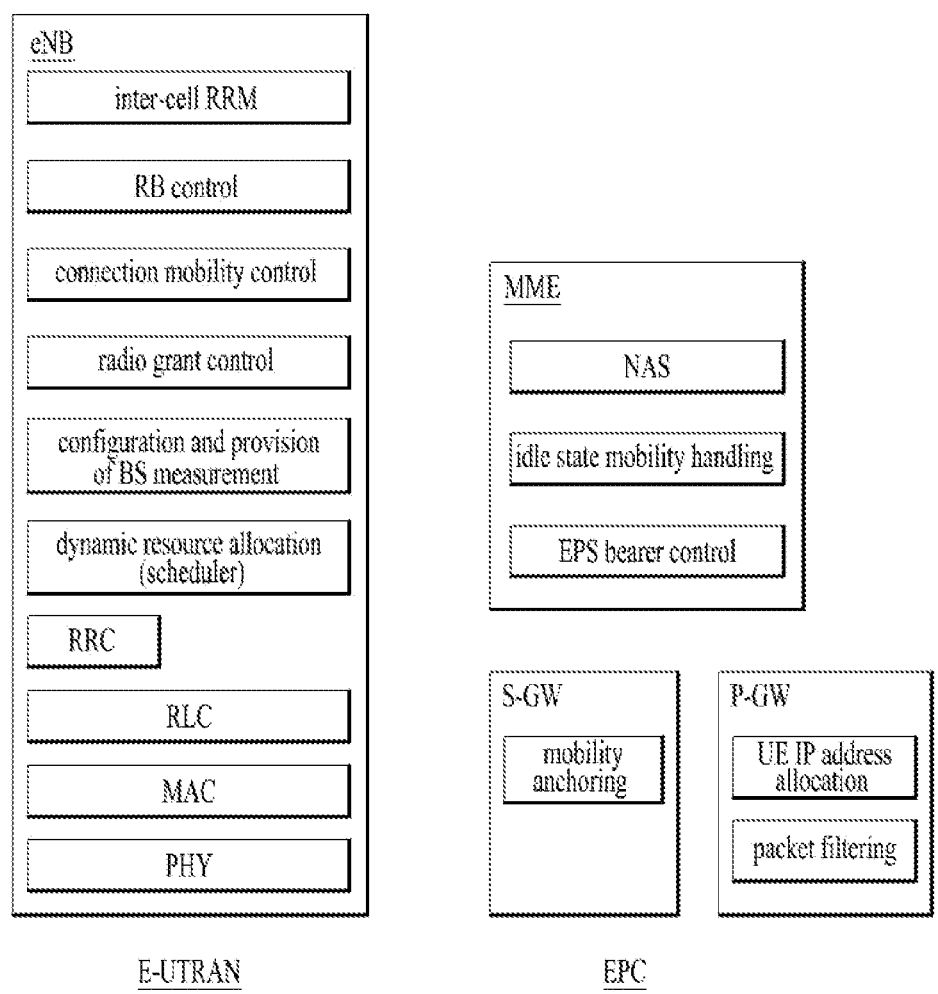
FIG. 2 is a diagram exemplarily illustrating architectures of a general E-UTRAN and EPC.

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane. FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
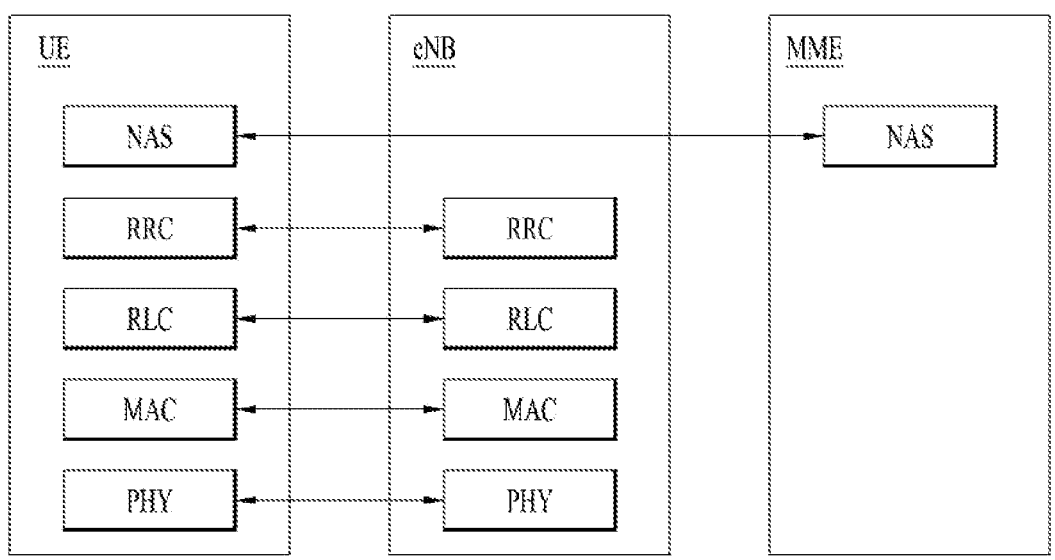
FIG. 3 is a diagram exemplarily illustrating the structure of a radio interface protocol in a control plane.
Figure 4:
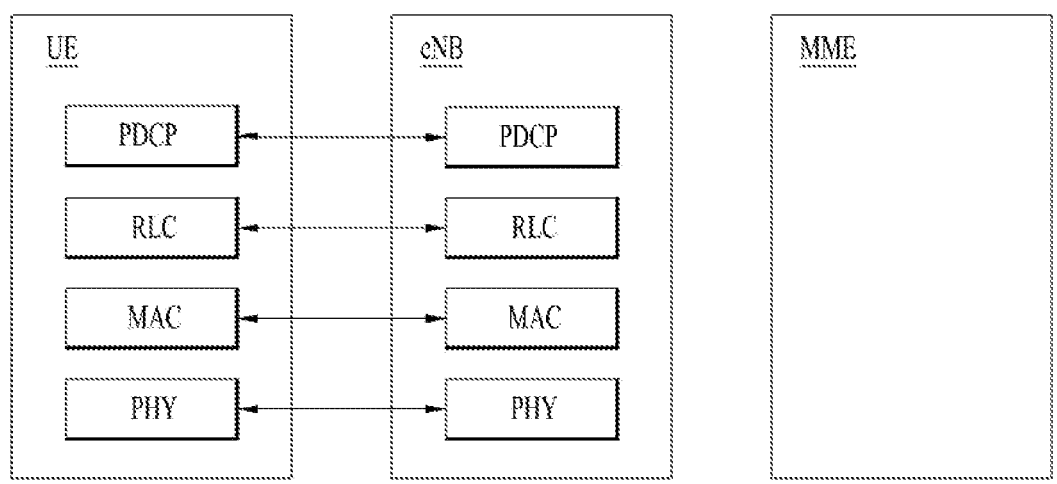
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC_Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
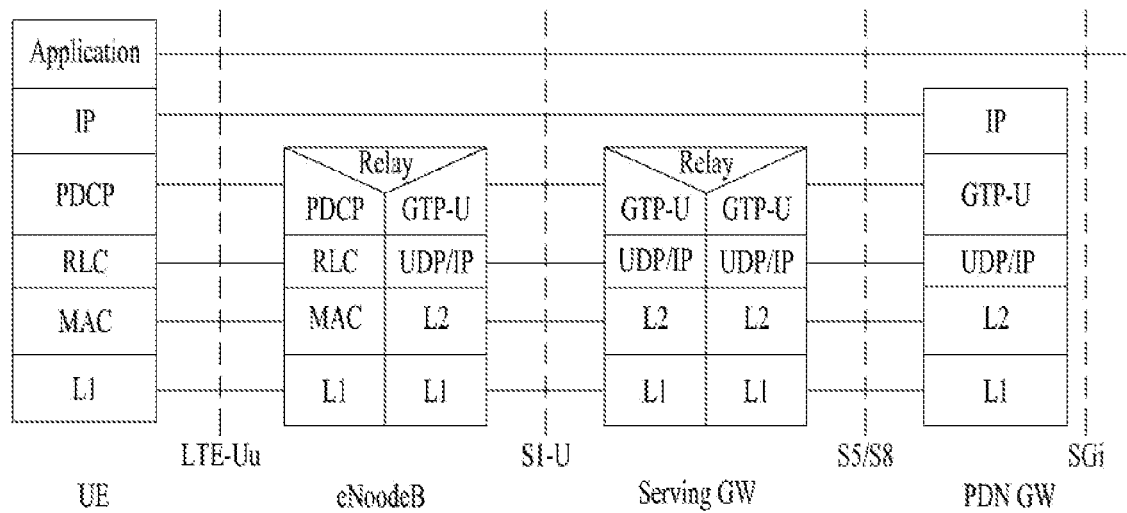
FIG. 5 is a diagram illustrating LTE (Long Term Evolution) protocol stacks for a user plane and a control plane.
Figure 5:
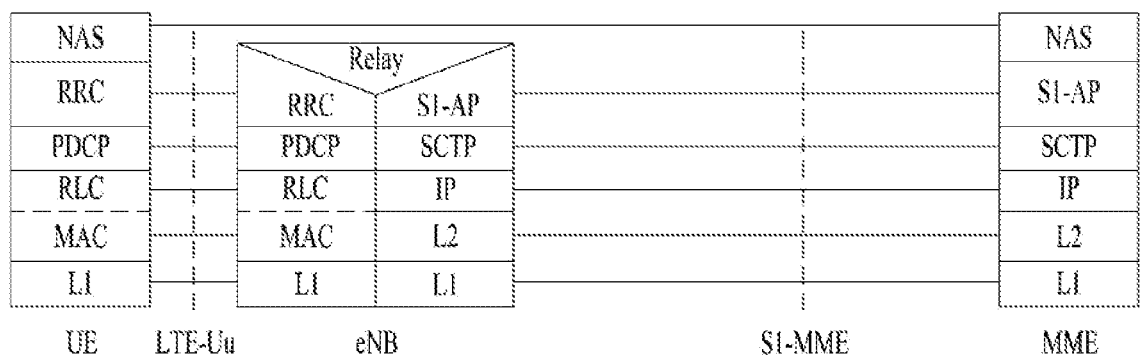

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
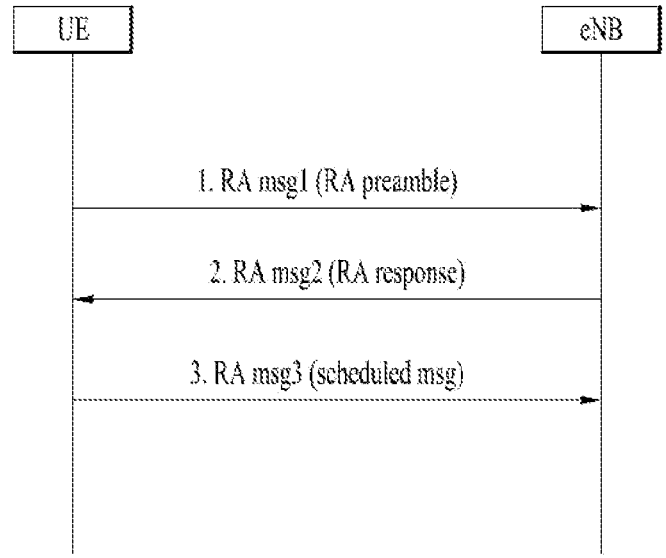
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.
1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.
2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).
3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
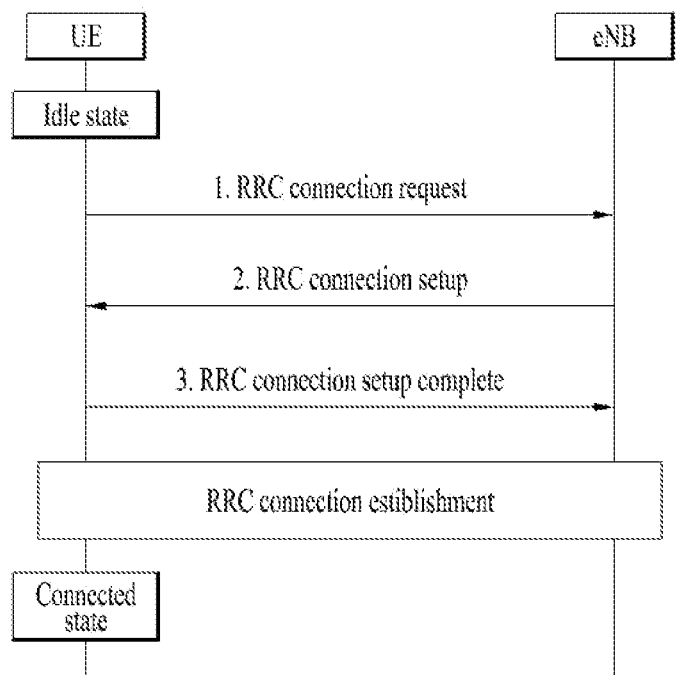
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle stat.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC_CONNECTED state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB. Such a procedure will be described below in more detail with reference to FIG. 7.
1. When the UE in RRC_IDLE desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

When new traffic occurs, the UE in the idle state performs a service request procedure in order to transition to an activation state in which the UE may transmit/receive traffic. When an S1 connection is released and no radio resources are allocated to the UE, due to traffic deactivation, although the UE has been registered in the network, i.e., when the UE is in an ECM-Idle state although the UE is in an EMM-Registered state, if traffic that the UE needs to transmit or the network needs to transmit to the UE occurs, the UE transmits a service request to the network. Upon successfully completing the service request procedure, the UE transitions to an ECM-Connected state and establishes an ECM connection (i.e., RRC connection+S1 signaling connection) in a control plane and an E-RAB (i.e., DRB and S1 bearer) in a user plane, thereby transmitting/receiving traffic. When the network desires to transmit traffic to the UE in the ECM-Idle state, the network transmits a paging message to the UE to announce that there is traffic to be transmitted, so that the UE may perform the service request procedure. For details of the network-triggered service request procedure of an LTE system, reference may be made to Section 5.3.4.3 of the specification 3GPP TS 23.401.

The UE having traffic to be transmitted transmits an RRC connection request to the eNB through a random access procedure including steps 1) to 3) of FIG. 7. Upon accepting the RRC connection request of the UE, the eNB transmits an RRC connection setup message to the UE. Upon receiving the RRC connection setup message, the UE loads a service request in an RRC connection setup complete message and transmits the RRC connection setup complete message to the eNB. For details of the UE-triggered service request procedure of the LTE system, reference may be made to Section 5.3.4.1. of the specification 3GPP TS 23.401.

Massive mobile data traffics have been generated in a mobile communication network for recent several years due to the development and fast market penetration of smart-phones, and a communication traffic type has been remarkably changed from the legacy peer-to-peer communication to communication in which applications perform signal exchange autonomously. In a mobile communication system of high speed and high capacity, traffic congestion control is important in maintaining service stability in various statuses. Also, when a major disaster such as a big earthquake is generated, a mobile data traffic may be increased to an unexpected level and the network may be operated in error. Therefore, the mobile communication system needs a mechanism for preventing an unexpected high traffic from occurring before the unexpected high traffic is generated. To make sure of successful communication for emergency call and/or disaster board, a traffic congestion control mechanism is required to reduce a call which is not important/has a low priority to allow network resources for a call which is important/has a high priority to be available for many users if possible. In 3GPP, a series of traffic congestion mechanisms have been standardized to control mobile communication access for a network. One access control mechanism standardized as a part of 3G (UMTS) specifications and widely used in LTE is referred to as "access class (AC)" which is a control technology which uses priority identifier data stored in the UE. Hereinafter, a legacy access control mechanism will be described in more detail.

Under certain circumstances, it could be desirable to prevent UE users from making access attempts (including emergency call attempts) or responding to pages in specified areas of a PLMN. Such situations may arise during states of emergency, or where 1 of 2 or more co-located PLMNs has failed. Broadcast messages are available on a cell by cell basis indicating the class(es) or categories of subscribers barred from network access. The use of these facilities could allow the network operator to prevent overload of the access channel under critical conditions. It is not intended that access control be used under normal operating conditions. It should be possible to differentiate access control between CS and PS domains. Details on the existing access control are specified in 3GPP TS 23.122 and 3GPP TS 25.304. Not all RATs need to support access control functionality.

All UEs are randomly allocated one of Access Classes 0 to 9, and the allocated Access Class value is stored in the SIM/USIM. In addition, UEs may be members of one or more out of 5 special categories (Access Classes 11 to 15), also held in the SIM/USIM. These are allocated to specific high priority users as follows (the following enumeration is not meant as a priority sequence):

Access Class 15: PLMN Staff;
Access Class 14: Emergency Services;
Access Class 13: Public Utilities (.g. water/gas suppliers);
Access Class 12: Security Services;
Access Class 11: For PLMN use.

Access control used in a current LTE/EPS system is based on access class barring (ACB) on the basis of an access control method which has been used in UMTS and GSM systems, which are legacy systems of the LTE/EPS system. As standardization is in progress, new mechanisms based on ACB, for example, service specific access control, access control for circuit switched fallback (CSFB), extended access barring (EAB), application specific access control, emergency calls, and prevention of mobile originating signaling and/or data traffic, have been added to access control mechanisms used in the current LTE/EPS system. Hereinafter, access control mechanisms used in a legacy LTE/EPS system will be described.

Access Class Barring (ACB)

If the UE is a member of at least one Access Class which corresponds to the permitted classes as signalled over the air interface, and the Access Class is applicable in the serving network, access attempts are allowed. Additionally, in the case of the access network being UTRAN the serving network can indicate that UEs are allowed to respond to paging and perform location registration, even if their access class is not permitted. Otherwise access attempts are not allowed. Otherwise access attempts are not allowed. Also, the serving network can indicate that UEs are restricted to perform location registration, although common access is permitted. If the UE responded to paging it shall follow the normal defined procedures and react as specified to any network command. Access Classes are applicable as follows:

Access Classes 0-9: Home and Visited PLMNs;
Access Classes 11 and 15: Home PLMN only if EHPLMN (equivalent Home PLMN) list is not present or any EHPLMN, or any EHPLMN;
Access Classes 12, 13, 14: Home PLMN, and visited PLMNs (VPLMNs) belonging to the same home country. For this purpose the home country is defined as the country of the mobile country code (MCC) part of the IMSI.

Any number of these classes may be barred at any one time. In the case of multiple core networks sharing the same access network, the access network is able to apply Access Class Barring for the different core networks individually. The following is the requirements for enhanced Access control on E-UTRAN.

The serving network shall be able to broadcast mean durations of access control and barring rates (e.g. percentage value) that commonly applied to Access Classes 0-9 to the UE. The same principle as in UMTS is applied for Access Classes 11-15.

E-UTRAN shall be able to support access control based on the type of access attempt (i.e. mobile originating data or mobile originating signalling). E-UTRAN shall be able to form combinations of access control based on the type of access attempt (e.g. mobile originating and mobile terminating, mobile originating, or location registration). The 'mean duration of access control' and the barring rate are broadcasted for each type of access attempt (i.e. mobile originating data or mobile originating signalling).

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed. Otherwise, the access attempt is not allowed. If the access attempt is not allowed, further access attempts of the same type are then barred for a time period that is calculated based on the 'mean duration of access control' provided by the network and the random number drawn by the UE.

The serving network shall be able to indicate whether or not a UE shall apply Access Class Barring for SMS access attempts in SMS over SGs, SMS over IMS (SMS over IP), and SMS over S102. This indication is valid for Access Classes 0-9 and 11-15.

The serving network shall be able to indicate whether or not a UE shall apply Access Class Barring for multi-medial telephony (MMTEeL) voice access attempts. This indication is valid for Access Classes 0-9 and 11-15.

The serving network shall be able to indicate whether or not a UE shall apply Access Class Barring for MMTeL video access attempts. This indication is valid for Access Classes 0-9 and 11-15.

Service Specific Access Control

Additionally to the requirements described in the clause of ACB, in E-UTRAN, access control shall be possible to support a capability called Services Specific Access Control (SSAC) to apply independent access control for telephony services (MMTeL) for mobile originating session requests from idle-mode and connected-mode as following.

The serving network shall be able to indicate (as specified above in the clause of ACB) whether or not a UE subject to SSAC shall also apply Access Class Barring.

EPS shall provide a capability to assign a service probability factor and mean duration of access control for each of MMTeL voice and MMTeL video:

assign a barring rate (percentage) commonly applicable for Access Classes 0-9.

assign a flag barring status (barred/unbarred) for each Access Class in the range 11-15.

SSAC shall not apply to Access Class 10.

SSAC can be provided by the VPLMN based on operator policy without accessing the HPLMN.

SSAC shall provide mechanisms to minimize service availability degradation (i.e. radio resource shortage) due to the mass simultaneous mobile originating session requests and maximize the availability of the wireless access resources for non-barred services.

The serving network is able to broadcast mean durations of access control, barring rates for Access Classes 0-9, barring status for Access class in the range 11-15 to the UE.

The UE determines the barring status with the information provided from the serving network, and perform the access attempt accordingly. The UE draws a uniform random number between 0 and 1 when initiating connection establishment and compares with the current barring rate to determine whether it is barred or not. When the uniform random number is less than the current barring rate and the type of access attempt is indicated allowed, then the access attempt is allowed; otherwise, the access attempt is not allowed. If the access attempt is not allowed, further access attempts of the same type are then barred for a time period that is calculated based on the 'mean duration of access control' provided by the network and the random number drawn by the UE.

Access Control for CSFB

Access Control for CSFB provides a mechanism to prohibit UEs to access E-UTRAN to perform CSFB. It minimizes service availability degradation (i.e. radio resource shortage, congestion of fallback network) caused by mass simultaneous mobile originating requests for CSFB and increases the availability of the E-UTRAN resources for UEs accessing other services. When an operator determines that it is appropriate to apply access control for CSFB, the network may broadcast necessary information to provide access control for CSFB for each class to UEs in a specific area. The network is able to separately apply access control for CSFB, SSAC and enhanced Access control on E-UTRAN.

The following requirements apply for CSFB to 1×RTT: In E-UTRAN, the network may apply access control for mobile originating session requests on CSFB from 1×RTT/E-UTRAN UE, The parameters received by the UE are dealt with in accordance with CDMA2000 procedures in 3GPP2 C.S0004-A: "Signaling Link Access Control (LAC) Standard for cdma2000 Spread Spectrum Systems—Addendum 2".

For CSFB to UTRAN or GERAN, the necessary information in the broadcast to provide access control for CSFB is the same as that specified above in the clause of ACB. In addition to those requirements the following apply:

Access control for CSFB applies for Access Class 0-9 and Access Class 11-15. It shall not apply for Access Class 10.

Access control for CSFB is applied for idle mode UE.

Access control for CSFB applies to all CSFB services.

Access control for CSFB may be provided by the VPLMN based on operator policy without accessing the HPLM.

If Access control for CSFB, according to the UE's access class, disallows originating session requests for CSFB then a UE does not send mobile originating session requests for CSFB.

If Access control for CSFB is applied by the UE for a mobile originating session request for CSFB, the UE bypasses enhanced Access control on E-UTRAN for that session.

The criteria on which a UE determines whether Access control for CSFB allows or disallows originating session requests for CSFB are equivalent to those for enhanced Access control on E-UTRAN, as described in the clause of ACB.

If access is not granted for the UE, mobile originating session requests for CSFB are restricted for a certain period of time to avoid overload of E-UTRAN due to continuous mobile originating session requests from the same UE. The duration of the period is determined using the same operation used in ACB.

In case the network does not provide the Access control for CSFB information, the UE shall be subject to access class barring for Access Classes 0-9 and 11-15 as described in the clause of ACB.

Extended Access Barring (EAB)

EAB is a mechanism for the operator(s) to control Mobile Originating access attempts from UEs that are configured for EAB in order to prevent overload of the access network and/or the core network. In congestion situations, the operator can restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs in a specific area. The following requirements apply for EAB:

The UE is configured for EAB by the HPLMN.

EAB shall be applicable to all 3GPP Radio Access Technologies.

EAB shall be applicable regardless of whether the UE is in a Home or a Visited PLMN.

A network may broadcast EAB information.

EAB information defines whether EAB applies to UEs within one of the following categories: a) UEs that are configured for EAB, b) UEs that are configured for EAB and are neither in their HPLMN nor in a PLMN that is equivalent to it, c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

EAB information also includes extended barring information for Access Classes 0-9.

A UE configured for EAB uses its allocated Access Class(es), when evaluating the EAB information that is broadcast by the network, in order to determine if its access to the network is barred.

If a UE that is configured for EAB initiates an emergency call or is a member of an Access Class in the range 11-15 and according to ACB that Access Class is permitted by the network, then the UE ignores any EAB information that is broadcast by the network.

If the network is not broadcasting the EAB information, the UE is subject to access barring as described in the clause of ACB.

If the EAB information that is broadcast by the network does not bar the UE, the UE shall be subject to access barring as described in the clause of ACB.

In the case of multiple core networks sharing the same access network, the access network shall be able to apply the EAB for the different core networks individually.

Overriding Extended Access Barring is a mechanism for the operator to allow UEs that are configured for EAB to access the network under EAB conditions. The following requirements apply.

The UE configured with EAB may be configured by the HPLMN with a permission to override EAB.

For a UE configured with the permission to override EAB, the user or application (upper layers in UE) may request the UE to activate PDN connection(s) for which EAB does not apply.

The UE overrides any EAB restriction information that is broadcast by the network as long as it has an active PDN connection for which EAB does not apply.

Application specific Congestion control for Data Communication (ACDC)

Application specific Congestion control for Data Communication (ACDC) is an access control mechanism for the operator to allow/prevent new access attempts from particular, operator-identified applications in the UE in idle mode. ACDC does not apply to UEs in connected mode. The network can prevent/mitigate overload of the access network and/or the core network. This feature is optional. The following requirements apply:

This feature is applicable to UTRAN PS Domain and E-UTRAN.

This feature is applicable to UEs in idle mode only that are not a member of one or more of Access Classes 11 to 15.

ACDC does not apply to MMTEL voice, MMTEL video and SMS over IMS (SMS over IP) services.

The home network is able to configure a UE with at least four and a maximum of sixteen ACDC categories to each of which particular, operator-identified applications are associated.

The serving network is able to broadcast, in one or more areas of the RAN, control information, indicating barring information per each ACDC category, and whether a roaming UE shall be subject to ACDC control. The barring information may be similar to ACB information, and include mean durations of access control (i.e., barring timer) and barring rates (i.e., percentage value). If the barring timer is running due to a previous access attempt from an application in a certain given matched ACDC category, the UE may only allow access attempts from applications in higher ACDC categories (according to the corresponding barring information for those higher categories). If the barring timer is running due to a previous access attempt from an application in a certain given unmatched ACDC category or a uncategorized application, the UE may only allow access attempts from applications in higher ACDC categories than the lowest ACDC category broadcast (according to the corresponding barring information for those higher categories).

The UE is able to control whether or not an access attempt for a certain application is allowed, based on this broadcast barring information and the configuration of ACDC categories in the UE.

The serving network is able to simultaneously indicate ACDC with other forms of access control.

When both ACDC and ACB controls are indicated, ACDC overrides ACB.

If a UE is configured for both EAB and ACDC, and the serving network simultaneously broadcasts EAB information and ACDC barring information:

If the UE determines as described in the clause of EAB that access to the network is not barred or as described in the clause of overriding EAB that it is permitted to override an EAB restriction, then access to the network is subject to ACDC.

If the UE determines as specified in the clause of EAB that access to the network is barred and as specified in the clause of overriding EAB that it is not permitted to override the EAB restriction, then access to the network is barred.

In the case of multiple core networks sharing the same access network, the access network is able to apply ACDC for the different core networks individually. For the mitigation of congestion in a shared RAN, barring rates are set equal for all participating operators.

When configuring the UE with categories of applications, the home network proceeds as follows:

Applications whose use is expected to be restricted the least are assigned the highest ACDC category; and Applications whose use is expected to be restricted more than applications in the highest category are assigned the second-to-highest ACDC category, and so on; and Applications whose use is expected to be restricted the most shall either be assigned the lowest ACDC category, or not be categorized at all.

For a UE with ACDC categories configured, the applications on the UE that are not assigned to any ACDC category are treated by the UE as part of the lowest ACDC category broadcast by the serving network. If the operator requires differentiation with respect to these uncategorized applications, the operator avoids assigning applications to the lowest ACDC category. When applying ACDC, the serving network broadcasts barring information starting from the highest to the lowest ACDC category. The home network and the serving network may use different categorization. The serving network determines if ACDC applies to roaming UEs.

The number of ACDC categories in the UE may not be the same as the number of ACDC categories broadcast by the serving network. This may happen, e.g. when the UE is roaming and the number of categories broadcast by the serving network is different from the home network. Therefore the following rules may apply:

If the serving network broadcasts more ACDC categories than the UE's configuration, the UE uses barring information for the matching ACDC category, and bars uncategorized applications using the barring information for the lowest category broadcast by the serving network, and ignores barring information for unmatched categories.

If the serving network broadcasts barring information for fewer ACDC categories than the UE's configuration, the UE uses barring information for the matching ACDC category and bars other applications using the barring information for the lowest category broadcast by the serving network. A matching ACDC category is an ACDC category for which barring information is broadcast by the serving network and that has the same rank as the rank of a configured ACDC category in the UE. An unmatched ACDC category is either an ACDC category for which barring information is broadcast by the serving network but with no corresponding ACDC category configured in the UE, or an ACDC category configured in the UE but with no corresponding barring information broadcast by the serving network.

Emergency Calls

An additional control bit known as "Access Class 10" is also signalled over the air interface to the UE. This indicates whether or not network access for Emergency Calls is allowed for UEs with access classes 0 to 9 or without an IMSI. For UEs with access classes 11 to 15, Emergency Calls are not allowed if both "Access class 10" and the relevant Access Class (11 to 15) are barred. Otherwise, Emergency Calls are allowed.

Multimedia Priority Service

Multimedia Priority Service (see 3GPP TS 22.153) is assigned its own unique access class value (i.e., one of the special access classes 11 to 15). The assigned access class value for Multimedia Priority Service is based on regional/national regulatory requirements and operator policy.

Control of UE Capabilities

To protect the user from the effects of a misbehaving UE (e.g. causing additional charges, degraded performance) and to protect the network operator's network capacity, including radio resources and network signalling and processing, means shall be provided for the HPLMN/EHPLMN and the VPLMN to provide an indication to the UE as to which network provided services or functions it is not allowed to use. The Selective UE Capabilities list, shall be maintained in the UE and the UE shall not request any services indicated as disabled. At registration the HPLMN/EHPLMN or VPLMN may interrogate the status of the list and provide a new list. The Selective UE Capabilities list is not deleted at switch off and remains valid until a new list is provided by the network. The Selective UE Capabilities list relates to the mobile equipment (ME) and not to the subscription. It should be ensured that UEs are not maliciously disabled, including malicious disabling by a VPLMN, or accidentally disabled, or kept disabled, and there shall be a mechanism for restoring disabled UEs in all situations (e.g. in the case that the serving network does not support the control of UE Capabilities). The UE uses the indications given in the Selective UE Capabilities list to inform the user of the non-availability of services or functions. There shall be a means for the network to provide an optional customer service number(s) which can be used, by the user, to assist in determining the cause of non-availability of specific services. The specifications should also provide the capability for the network to include an optional text string that will be displayed by the UE. The UE Capabilities list takes precedence over subscribed services. The services to be included in the list are:

Call Control functions;
Supplementary Services;
Emergency Calls (including the (U)SIM-less case and subject to regional regulatory requirements, i.e. emergency calls shall not be disabled in regions where support of them is required));
SMS, via CS and PS;
LCS, via CS and PS;
GPRS based services;
MBMS;
IMS.

Currently, research has been conducted into a next generation mobile communication system after EPC in 3GPP, that is, a 5G system. The 5G system supports radio access technology (RAT), eLTE, non-3GPP (e.g., WLAN) access, and so on as an enhanced technology from the 4G LTE mobile communication technology through evolution of a mobile communication network structure or a clean-state structure.

Figure 8:
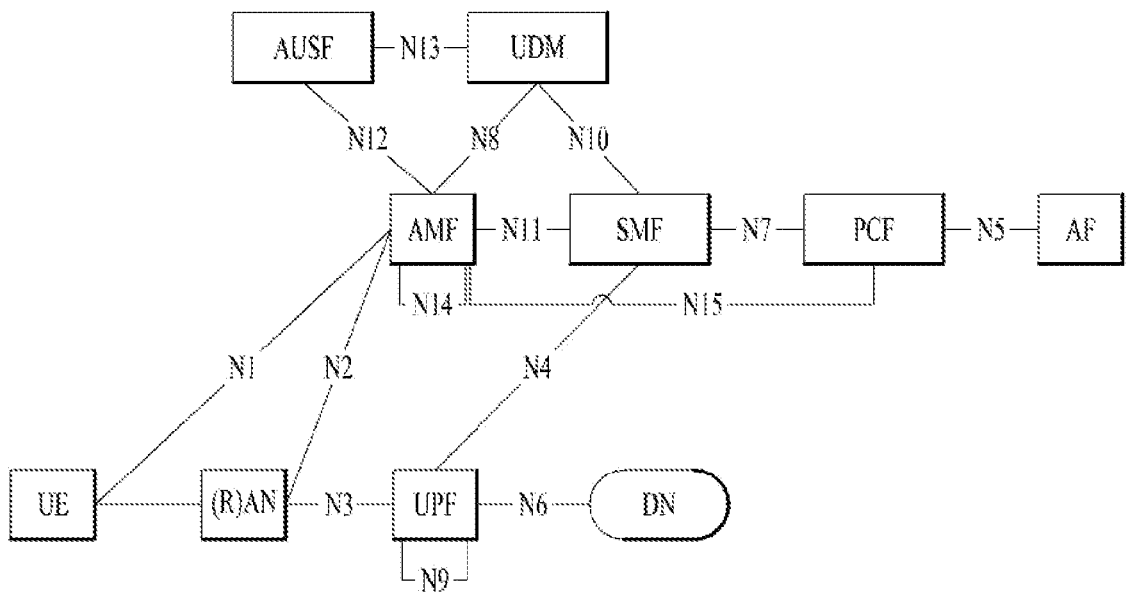
FIG. 8 illustrates an example of 5G system architecture.
Figure 8:
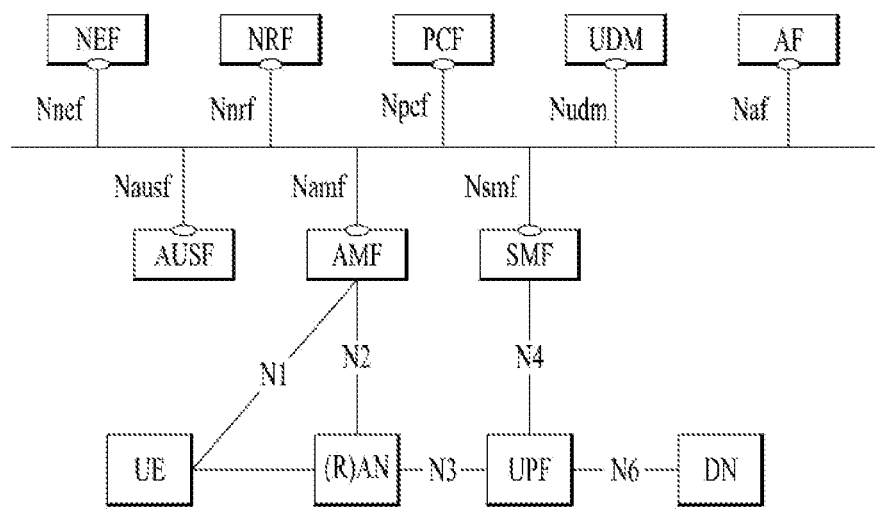

FIG. 8 illustrates an example of 5G system architecture. In particular, FIG. 8(a) illustrates an example of 5G system architecture via reference point representation. FIG. 8(b) illustrates an example of 5G system architecture via service-based representation. The 5G architecture is defined as service-based and the interaction between network functions is represented in two ways.

Reference point representation (see FIG. 8(a)): This shows an interaction present between NF services in network functions described by point-to-point reference point (e.g., N11) between any two network functions (e.g., AMF and SMF).

Service-based representation (see FIG. 8): Here, network functions (e.g., AMF) in a control plane enables other authorized network functions to access their services. This representation may also include point-to-point reference point where necessary.

Referring to FIG. 8(a), the 5G system architecture may include various network functions (NFs). The NFs included in the 5G system architecture may be, for example, an authentication server function (AUSF), an access and mobility management function (AMF), a data network (DN), a policy control function (PCF), a session management function (SMF), unified data management (UDM), a user plane function (UPF), a user equipment (UE), (radio) access network ((R)AN), and so on.

The AMF of the NFs of the 5G system may include, for example, the following functionality: Termination of RAN CP interface (i.e., N2 interface), termination of NAS (N1), NAS ciphering and integrity protection, AS security control, registration management (e.g., registration region management), connection management, IDLE mode UE reachability management, mobility management (e.g., which includes performing and control of paging retransmission), mobility management control (e.g., subscription and policy), a function of supporting intra-system mobility and inter-system mobility, support of network slicing, SMF selection, lawful intercept (LI) (with respect to an AMF event and an interface to an L1 system), a function of providing transport for session management (SM) messages between a UE and an SMF, access authentication, access authorization including roaming authority check, a function of providing an SMS message between a UE and a SMSF, a security anchor function (SEAF), security context management (SCM), etc. EPS bearer ID allocation for interworking with EPS, etc. All or some of functions of the AMF may be supported in a single instance of one AMF.

The DN of the NFs of the 5G system may refer to, for example, an operator service, Internet access, a $3^{rd}$ party service, or the like. The DN may transmit a downlink protocol data unit (PDU) to the UPF or may receive a PDU transmitted from a UE from the UPF.

The PCF may receive information on a packet flow from an application service and may provide a function of determining a policy such as mobility management and session management. In detail, the PCF may support a function of supporting a simplified policy framework for control of a network operation, a function of providing a policy rule to implement the policy rule by a control plane (CP) function(s) (e.g., AMF and SMF), a function of embodying a front end for related subscription and access for determination of a policy in a user data repository (UDR), etc.

The SMF may provide a session management function and, when a UE has a plurality of sessions, the respective sessions may be managed by different SMFs. In detail, the SMF may support a function such as session management (e.g., session establishment, modification, and release including maintenance of a tunnel between a UPF and an access network (AN) node), allocation and management of a UE IP address (which selectively includes authentication), selection and control of a user plane (UP), setting of traffic steering for routing traffic to an appropriate destination in the UPF, termination of an interface toward policy control functions, execution of a policy and a control part of QoS, lawful intercept (LI) (with respect to an SM event and an interface to an L1 system), an end of an SM part of an NAS message, downlink data notification (DDN), an initiator of AN-specific SM information (transport to AN through N2 via AMF), determination of an SSC mode of a session, and a roaming function. All or some of functions of the SMF may be supported in a single instance of one SMF.

The UDM may store user subscription data, policy data, and so on. The UDM may include two parts, that is, an application front end (FE) and a user data repository (UDR). The FE may include a UDM FE that is in charge of position management, subscription management, credential processing, and so on, and a PCF that is in charge of policy control. The UDR may store data required for functions provided by the UDM FE and a policy profile required by the PCF. The data stored in the UDR may include a subscription identifier, security credential, access and mobility related subscription data, and user subscription data including session related subscription data, and policy data. The UDM-FE may access the subscription information stored in the UDR to support a function such as authentication credential processing, user identification handling, access authentication, registration/mobility management, subscription management, and SMS management.

The UPF may transfer the downlink PDU received from the DN to a UE through the (R)AN and the uplink PDU received from the UE to the DN through the (R)AN. In detail, the UPF may support a function such as an anchor point for intra-RAT/inter-RAT mobility, an external PDU session point of interconnection to a data network, packet routing and forwarding, a user plane part of packet inspection and policy rule implementation, lawful intercept, traffic usage report, an uplink classifier for support of routing of traffic flow to a data network, a branching point for support of a multi-homed PDU session, QoS handling (e.g., packet filtering, gating, and uplink/downlink rate implementation) for a user plane, uplink traffic verification (SDF mapping between service data flow (SDF) and QoS flow), transport level packet marking in uplink and downlink, downlink packet buffering, and downlink data notification triggering. All or some of functions of the UPF may be supported in a single instance of one UPF.

The gNB may support functions for radio resource management (i.e., radio bearer control, radio admission control, connection mobility control, and dynamic allocation of resources to a UE in uplink/downlink (i.e., scheduling)), Internet protocol (IP) header compression, encryption and integrity protection of a user data stream and, selection of an AMF during attachment of a UE when routing to the AMF from information provided to the UE is not determined, user plane data routing to UPF(s), control plane information routing to the AMF, connection setup and release, scheduling and transmission (generated from the AMF) of a paging message, scheduling and transmission of system broadcast information (generated from the AMF or operating and maintenance (O&M)), measurement for mobility and scheduling and measurement report setting, transport level packet marking in uplink, session management, support of network slicing, mapping between QoS flow management and a data radio bearer, support of a UE in an inactive mode, a distribution function of a NAS message, a NAS node selection function, radio access network sharing, dual connectivity, and tight interworking between an NR and an E-UTRA.

Although FIG. 8(a) exemplifies a reference model of the case in which a UE accesses one DN using one PDU session for convenience, the present disclosure is not limited thereto. The UE may simultaneously access two data networks (e.g., a local DN and a central DN) using a plurality of PDU sessions. In this case, two SMFs may be selected for different PDU sessions. However, each SMF may have capability for controlling both a local UPF and a central UPF in a PDU session. In addition, the UE may simultaneously access two data networks (e.g., a local DN and a central DN) provided in a single PDU session.

In a 3GPP system, a conceptual link for connection between NFs in a 5G system is defined as a reference point. Reference points included in 5G system architecture represented in FIG. 8(a) are exemplified as follows.

N1: Reference point between the UE and the AMF.
N2: Reference point between the (R)AN and the AMF.
N3: Reference point between the (R)AN and the UPF.
N4: Reference point between the SMF and the UPF.
N5: Reference point between PCF and AF.
N6: Reference point between the UPF and a Data Network.
N7: Reference point between the SMF and the PCF.
N7r: Reference point between the PCF in the visited network and the PCF in the home network.
N8: Reference point between the UDM and the AMF.
N9: Reference point between two core UPFs.
N10: Reference point between the UDM and the SMF.
N11: Reference point between the AMF and the SMF.
N12: Reference point between AMF and AUSF.
N13: Reference point between the UDM and Authentication Server function (AUSF).
N14: Reference point between two AMFs.
N15: Reference point between the PCF and the AMF in the case of non-roaming scenario, PCF in the visited network and AMF in the case of roaming scenario.
N16: Reference point between two SMFs, (in roaming case between SMF in the visited network and the SMF in the home network).
N17: Reference point between AMF and EIR.
N18: Reference point between any NF and UDSF.
N19: Reference point between NEF and SDSF.

A service-based interface exemplified in FIG. 8(b) indicates a set of a service provided/exposed by a predetermined NF. Service-based interfaces included in a 5G system architecture represented in FIG. 8(a) are exemplified as follows.

Namf: Service-based interface exhibited by AMF.
Nsmf: Service-based interface exhibited by SMF.

Nnef: Service-based interface exhibited by NEF.
Npcf: Service-based interface exhibited by PCF.
Nudm: Service-based interface exhibited by UDM.
Naf: Service-based interface exhibited by AF.
Nnrf: Service-based interface exhibited by NRF.
Nausf: Service-based interface exhibited by AUSF.

An NF service is a type of capability exposed by an NF (i.e., an NF service producer) to another NF (i.e., an NF service consumer) through a service-based interface. The NF may expose one or more NF service(s). To specify NF services, the following criteria may be applied:

NF services are derived from an information flow that describes an end-to-end functionality.

A complete end-to-end message flow is explained by a sequence of NF service invocations.

Two operations that NFs provide their services through a service-based interface are described as follows:

i) "Request-response": Control plane NF_B (i.e., an NF service producer) may receive a request for providing of a specific NF service (which includes performing of an operation and/or providing of information) from another control plane NF_A (i.e., an NF service consumer). The NF_B transmits as response the NF service result based on information provided by the NF_A in the request.

In order to fulfil the request, the NF_B may in turn consume NF services from other NF(s). In a request-response mechanism, communication is one-to-one between two NFs (i.e., a consumer and a producer).

ii) "Subscribe-notify"

Control plane NF_A (i.e., an NF service consumer) may subscribe to an NF service provided by another control plane NF_B (i.e., an NF service producer). A plurality of control plane NF(s) may subscribe to the same control plane NF service. The NF_B may notify interested NF(s) which subscribe to the NF service about a result of the NF service. A subscription request from a consumer may include a notification request for notification that is triggered through periodic updating or a specific event (e.g., requested information is changed or a specific threshold value is reached). The mechanism may also include the case in which NF(s) (e.g., NF_B) implicitly subscribes specific notification without an explicit subscription request (e.g., due to a successful registration procedure).

For NFs and reference points illustrated in FIG. 8, 3GPP TS 23.501 may be referenced.

Figure 9:
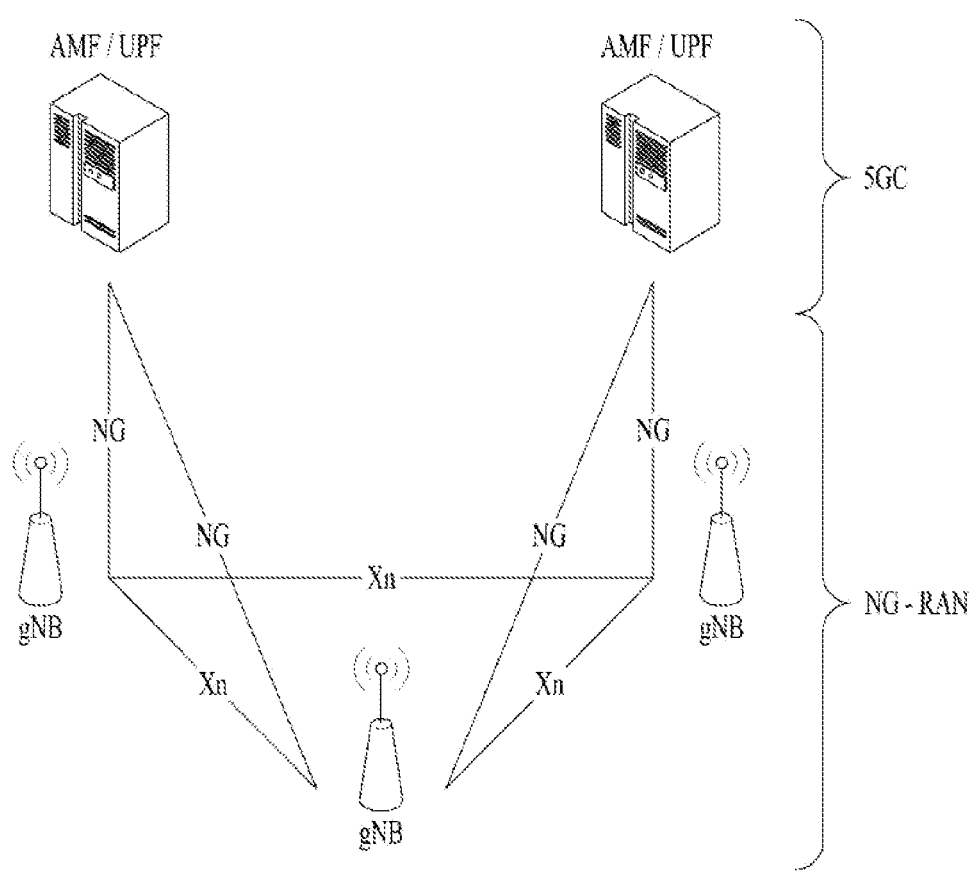
FIG. 9 illustrates an example of architecture of a new generation access network (NG-RAN).

FIG. 9 illustrates an example of architecture of a new generation access network (NG-RAN).

Referring to FIG. 9, NG-RAN (or which is also referred to as a 5G-RAN) may include gNB(s) and/or eNB(s), which provide terminations of user plane and control plane protocols toward a UE.

gNB(s) or eNB(s) connected to gNB(s) and a 5GC may be interconnected with each other using an Xn interface. gNB(s) and eNB(s) may be connected to a 5GC using an NG interface and, in detail, may be connected to an AMF using an NG-C interface (i.e., an N2 reference point) which is a control plane interface between an NG-RAN and a 5GC and may be connected to a UPF using an NG-U interface (i.e., an N3 reference point) which is a user plane interface between an NG-RAN and a 5GC.

Figure 10:
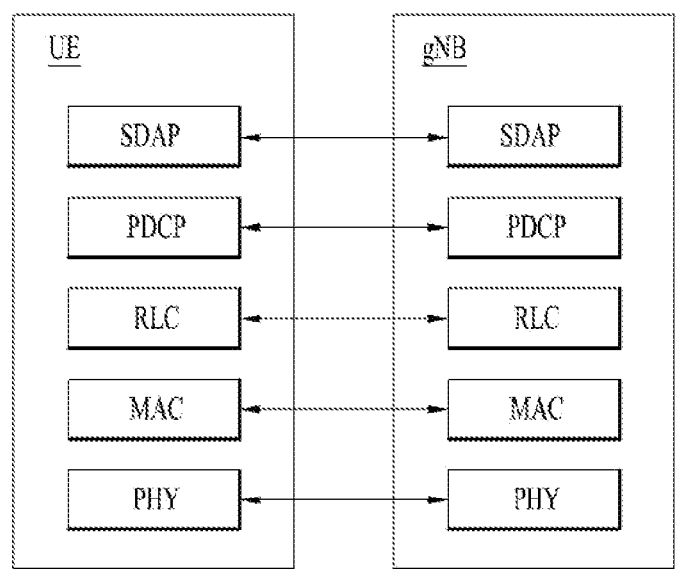
FIG. 10 illustrates an example of protocol stacks of a next generation wireless communication system.
Figure 10:
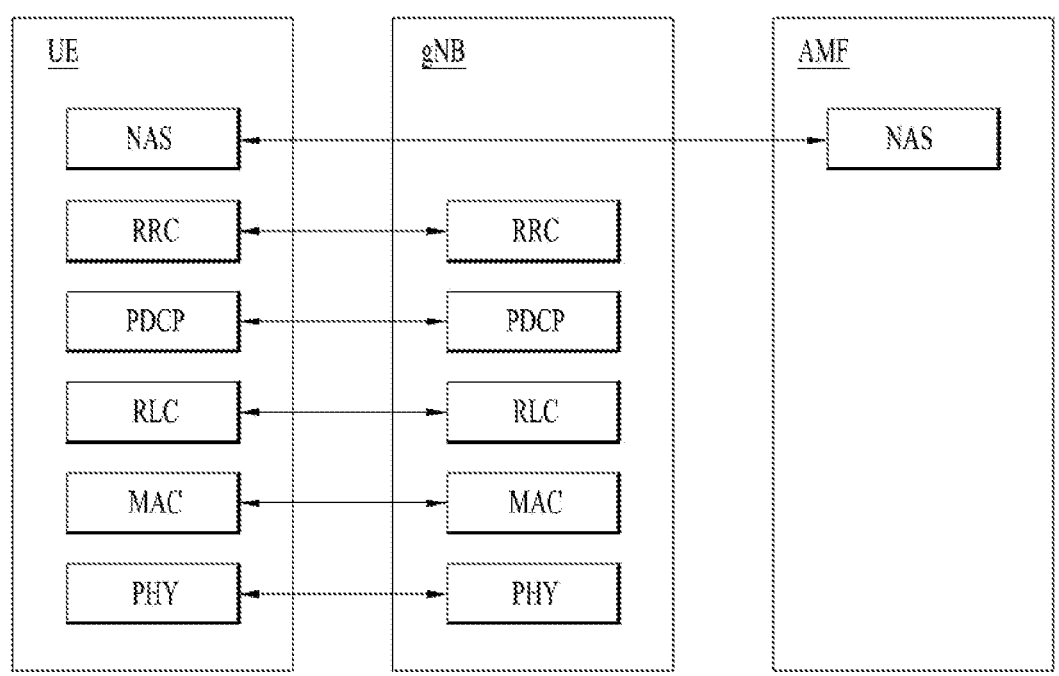

FIG. 10 illustrates an example of protocol stacks of a next generation wireless communication system. In particular, FIG. 10(*a*) illustrates an example of a radio interface user plane protocol stack between a UE and a gNB and FIG. 10(*b*) illustrates an example of a radio interface control plane protocol stack between a UE and a gNB.

The control plane refers to a path through which control messages used to manage call by a UE and a network are transported. The user plane refers to a path through which data generated in an application layer, for example, voice data or Internet packet data are transported.

Referring to FIG. 10(*a*), the user plane protocol stack may be divided into a first layer (Layer 1) (i.e., a physical layer (PHY) layer) and a second layer (Layer 2).

Referring to FIG. 10(*b*), the control plane protocol stack may be divided into Layer 1 (i.e., a PHY layer), Layer 2, Layer 3 (e.g., a radio resource control (RRC) layer), and a non-access stratum (NAS) layer.

Layer 2 may include a medium access control (MAC) sublayer, a radio link control (RLC) sublayer, and a packet data convergence protocol (PDCP) sublayer and, in the case of the user plane, may further include a service data adaptation protocol (SDAP) sublayer.

A radio bearer may be classified into two types as follows: A data radio bearer (DRB) for user plane data and a signaling radio bearer (SRB) for control plane data.

Hereinafter, each layer of a control plane and a user plane of a radio protocol is described.

A PHY layer as Layer 1 may use a physical channel to provide information transfer service from a higher layer. The physical layer may provide information transfer service from a higher layer. The physical layer may be connected to a MAC sublayer positioned at a higher level through a transport channel and data may be transmitted between the MAC sublayer and the PHY layer through the transport channel. The transport channel may be classified according to how data is transmitted through a radio interface and characteristics of data transmission. In addition, data may be transmitted through a physical channel between different physical layers and between a PHY layer of a transmission end and a PHY layer of a reception end.

The MAC sublayer may perform mapping between a logical channel and a transport channel; multiplexing/demultiplexing of a MAC service data unit (SDU) belonging to one or different logical channels to/from a transport block (TB) transferred to/from the PHY layer through a transport channel; scheduling information report; error correction through a hybrid automatic repeat request (HARQ); priority handling between UEs using dynamic scheduling, priority handling between logical channels of one UE using logical channel prioritization; and padding. Different types of data may transfer a service provided by the MAC sublayer. Each logical channel type may define a type of transferred information. The logical channel may be classified into two groups: A control channel and a traffic channel.

The control channel may be used to transfer only control plane information and may be as follows.

Broadcast control channel (BCCH): A downlink channel for broadcasting system control information.

Paging control channel (PCCH): A downlink channel for transferring notification of change in paging information and system information.

Common control channel (CCCH): A channel for transmitting control information between a UE and a network. The channel may be used for UEs that have no RRC connection with a network.

Dedicated control channel (DCCH): A point-to-point interaction channel for transmitting dedicated control information between a UE and a network. The channel may be used by a UE having RRC connection.

A traffic channel may be used to use only user plane information:

Dedicated traffic channel (DTCH): A point-to-point channel dedicated to a single UE for transferring user information. The DTCH may be present in both uplink and downlink.

In downlink, connection between a logical channel and a transport channel is as follows. The BCCH may be mapped to the BCH. The BCCH may be mapped to the DL-SCH. The PCCH may be mapped to the PCH. The CCCH may be mapped to the DL-SCH. The DCCH may be mapped to the DL-SCH. The DTCH may be mapped to the DL-SCH.

In uplink, connection between a logical channel and a transport channel is as follows. The CCCH may be mapped to the UL-SCH. The DCCH may be mapped to the UL-SCH. The DTCH may be mapped to the UL-SCH.

The RLC sublayer may support three transmission modes: a transparent mode (TM), an unacknowledged mode (UM), and an acknowledged mode (AM). An RLC configuration may be applied for each logical channel. In the case of the SRB, the TM or the AM mode may be used and, on the other hand, in the case of the DRB, the UM or the AM mode may be used. The RLC sublayer may perform transfer of a higher layer PDU; independent sequence numbering from the PDCP; error correction through an automatic repeat request (ARQ); segmentation and re-segmentation; reassembly of the SDU; discard of the RLC SDU; and RLC re-establishment.

The PDCP sublayer for the user plane may perform sequence numbering, header compression and decompression (only in the case of robust header compression and RoHC); user data transfer; reordering and duplicate detection (when transferring is required toward a higher layer than the PDCP); (in the case of a split bearer) PDCP PDU routing; retransmission of a PDCP SDU; encryption and deciphering; discard of the PDCP SDU; PDCP re-establishment and data recovery for an RLC AM; and duplication of the PDCP PDU. The PDCP sublayer for the control plane may further perform sequence numbering; ciphering; deciphering and integrity protection; control plane data transfer; duplicate detection; and duplication of the PDCP PDU. When duplication for a radio bearer is configured via RRC, an additional RLC entity and an additional logical channel may be added to a radio bearer to control duplicated PDCP PDU(s). Duplication in the PDCP may include transmission of the same PDCP PDU(s) twice. Primarily, the PDCP PDU may be transferred to an original RLC entity and, secondarily, may be transferred to an additional RLC entity. In this case, an original PDCP PDU and a corresponding duplicate may not be transmitted in the same transport block. Two different logical channels may belong to the same MAC entity (in the case of CA) or may belong to different MAC entities (in the case of DC). In the former case, logical channel mapping restriction may be used to ensure that an original PDCP PDU and a corresponding duplicate are not transmitted in the same transport block.

The SDAP sublayer may perform i) mapping between a QoS flow and a data radio bearer and ii) marking QoS flow identifier (ID) in downlink and uplink packet. A single protocol entity of the SDAP may be configured for each separate PDU session but, in the case of dual connectivity (DC), two SDAP entities may be exceptionally configured.

The RRC sublayer may perform broadcast of system information related to access stratum (AS) and non-access stratum (NAS); paging initiated by a 5GC or an NG-RAN; establishment, maintenance, and release of RRC connection between a UE and a NG-RAN (which further includes modification and release of carrier aggregation and further includes modification and release of the DC between an E-UTRAN and an NR or in the NR; a security function including key management; establishment, configuration, maintenance, and release of SRB(s) and DRB(s); handover and context transfer; UE cell selection and re-release and control of cell selection/re-selection; a mobility function including mobility between RATs; a QoS management function, UE measurement report, and report control; detection of radio link failure and discovery from radio link failure; and NAS message transfer to a UE from a NAS and NAS message transfer to the NAS from the UE.

In a legacy LTE system, when a UE is in an RRC_IDLE state over an access network, a UE is in an ECM_IDLE state over a core network when the UE is in an RRC_IDLE state over an access network and the UE is in an ECM_CONNECTED state in the core network when the UE is in an RRC_CONNECTED state over the access network. In other words, in the legacy LTE system, the UE in RRC_IDLE is a UE in ECM_IDLE and the RRC_CONNECTED UE is a UE in ECM_CONNECTED. In the case of a UE in IDLE, all S1 bearers (in S1-U) for the UE and logical S1-application protocol (S1-AP) signaling connection (over an S1-MME) may not be present. In the case of the UE in IDLE, in terms of a network, S1 signaling and RRC connection with the UE have not been established or have been released in a control plane, and a downlink S1 bearer and a data radio bearer (DRB) with the UE have not been established or have been released in a user plane. In terms of the UE_IDLE, an IDLE state may mean that RRC connection and the DRB of a UE are not present in each of the control plane and the user plane. For example, when connection is released once through a connection release procedure, ECM connection between the UE and the MME may be released and all contexts associated with the UE may be deleted in an eNB. Then, the UE may be transitioned to an ECM_IDLE state from an ECM_CONNECTED in the UE and the MME and may be transitioned to an ECM_IDLE from an RRC_CONNECTED state in the UE and the eNB. Accordingly, connection control with the UE needs to be always performed by a core network and paging for the UE needs to be initiated and managed by the core network. Thus, traffic transfer between the UE and the network may be delayed. When a UE in RRC_IDLE intends to transmit traffic or a network intends to transmit traffic to the UE in RRC_IDLE, the UE may be transitioned to RRC_CONNECTED through a service request procedure and, the service request procedure includes exchange of various messages. Accordingly, traffic transport between the UE and the network may be delayed.

To reduce delay during a transition procedure between RRC_IDLE and RRC_CONNECTED, research has been conducted to introduce an RRC_INACTIVE state to an LTE-A system and to support an RRC_INACTIVE state in a 5G system. For ex ample, an RRC layer of the 5G system may support three states having the following characteristics (refer to 3GPP TR 38.804 V0.7.0).

RRC_IDLE
Cell re-selection mobility;
Paging for mobile terminated data is initiated by a core network (e.g., 5GC);
Paging area is managed by core network (CN).
RRC_INACTIVE:
Cell re-selection mobility;
CN-NR RAN connection (both control and user planes) has been established for UE;

The UE access stratum (AS) context is stored in at least one gNB and the UE UE access stratum (AS);
Paging is initiated by NR RAN;
RAN-based notification area is managed by NR RAN;
NR RAN knows the RAN-based notification area which the UE belongs to;
RRC_CONNECTED:
The UE has an NR RRC connection;
The UE has an AS context in NR;
NR RAN knows the cell which the UE belongs to;
Transfer of unicast data to/from the UE;
Network controlled mobility, i.e. handover within NR and to/from E-UTRAN.

Figure 11:
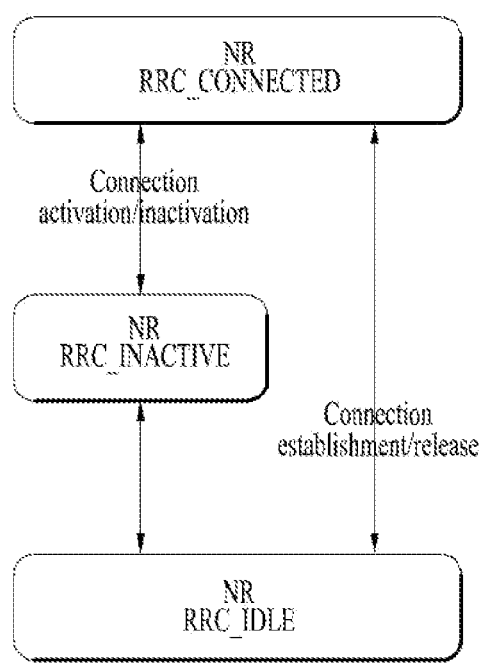
FIG. 11 illustrates UE state transitions in the next generation wireless communication system.

FIG. 11 illustrates UE state transitions in the next generation wireless communication system. A UE has only one RRC state at one time.

Referring to FIG. 11, the following state transitions are supported between the aforementioned RRC states: from RRC_IDLE to RRC_CONNECTED, following the "connection setup" procedure (e.g. request, setup, complete); from RRC_CONNECTED to RRC_IDLE, following (at least) the "connection release" procedure; from RRC_CONNECTED to RRC_INACTIVE, following the "connection inactivation" procedure; from RRC_INACTIVE to RRC_CONNECTED, following the "connection activation" procedure.

A UE in the RRC_INACTIVE state can be configured with the RAN-based notification area, whereupon: a notification area can cover a single or multiple cells, and can be smaller than CN area; a UE does not send any "location update" indication when it stays within the boundaries of the notification area; leaving the area, a UE updates its location to the network.

In the case of 4G communication, to register a UE to an EPS/LTE system and to maintain the registration state, the UE may perform an attachment procedure and a tracking area update (TAU) procedure (refer to 3GPP TS 23.401). In a 5G system, a registration procedure (refer to 3GPP TS 23.502) formed by combining a legacy attachment procedure and a TAU procedure may be performed. In the 5G system, registration management (RM) may be used to register or deregister a UE/user to a network and may establish a user context to the network. Two RM states of RM_DEREGISTRED and RM_REGISTERED may be used in the UE and the AMF and may reflect the registration state of the UE in the selected PLMN. Connection management (CM) may be used to establish or release signaling connection between the UE and the AMF. The CM may have functions of establishing and releasing signaling between the UE and the AMF over N1. The signaling connection may be used to enable NAS exchange between a UE and a core network and may include AN signaling connection between the UE and the AN (e.g., RRC connection over 3GPP access) and N2 connection for the UE between the AN and the AMF. To reflect NAS signaling connectivity of the UE with the AMF, two connection management (CM) states may be used: CM_IDLE and CM_CONNECTED. The CM_IDLE may be a state that is similar to or corresponds to ECM_IDLE of an LTE (i.e., 4G) system. The CM_CONNECTED may be a state that is similar to or corresponds to the ECM_CONNECTED of a legacy LTE system. A UE in CM_IDLE has no NAS signaling connection established with the AMF over N1 and there are no AN signaling connection, N2 connection, and N3 connection for the UE in CM_IDLE. The AMF may enter a CM_CONNECTED state with respect to the UE whenever N2 connection for the UE between the AN and the AMF is established. The UE in CM_CONNECTED may have a NAS signaling connection with the AMF over N1. The NAS signaling connection may use an RRC connection between the UE and the NG-RAN and may use an NGAP UE association between the AN and the AMF for 3GPP access. The UE in CM_CONNECTED may always enter a CM_IDLE state whenever the N2 signaling connection is released. In the LTE system of a version that does not support RRC_INACTIVE, a UE of ECM_CONNECTED means a UE of RRC_CONNECTED. However, when a UE CM state in the AMF is CM_CONNECTED, i.e., when the UE is in CM_CONNECTED, the UE of CM_CONNECTED may be a UE of RRC_CONNECTED or a UE of RRC_INACTIVE.

In terms of a core network, the UE in RRC_INACTIVE is similar to in the case in which the UE is in RRC_CONNECTED and, thus, data and signaling received by the core network are transferred directly to a RAN (e.g., BS) from the core network but, to transfer the data/signaling to the UE by the RAN between the UE and the RAN, a produce in which the UE is awaken through a paging procedure and a connection between the UE and the RAN is re-established may be required.

As mentioned previously, in the EPS system, i.e., in the LTE system, when there is data that the UE desires to transmit on UL, the UE transmits a service request message to the network and the network transmits a service accept message to the UE as a response to the service request message. In the process of transmitting the service accept message, the network makes all PDN connections established for the UE active. That is, in the EPS system, if the UE accesses the network, the network activates all PDU connections of the UE so that the UE can transmit packets at any time. This is problematic in that even PDN connections that the UE does not use are unnecessarily activated. For example, it is assumed that PDN connection #1 and PDN connection #2 are established for a certain UE, PDN connection #1 is for Internet access, and PDN connection #2 is for voice call access, i.e., for voice over LTE (VoLTE) or voice over Internet protocol (VoIP) access. In a situation in which the UE is in RRC_IDLE, if a user of the UE inputs certain words by activating, for example, an Internet chat application, the UE transmits the service request message to the network in order to transmit the words input by the UE. Then, the network activates all PDN connections established for the UE as a response to the service request message. Thus, although the UE wishes to use only a specific PDN connection, even PDN connections that the UE does not currently use are activated in legacy EPS. Then, the amount of information that the UE should process unnecessarily increases and the network also unnecessarily allocates resources. For example, in the EPS system, if even one of PDU connections for which an IP is allocated to the UE, i.e., PDU connections established for the UE, should be activated, an eNB or an S-GW should have generated a tunnel for each PDN connection of the UE. Accordingly, in the LTE system, PDN connections that should be activated when the UE transmits a service request are not separately indicated. As a result, in the LTE system, if there is a service request by the UE, the EPS network have unnecessarily allocated resources and generated signaling even for PDN connections that are not immediately used in actuality.

To solve the above problems, the 5G system has been defined to additionally include information indicating for which PDN connection, i.e., PDU session in the 5G term, the UE requests activation, when the UE transmits the service request message. For example, the following method has been proposed in the standard specifications (3GPP TS 23.502 and 24.501) for the 5G system. A service request procedure in the 5G system may be used to activate a user plane connection for an established PDU session both when the UE is in CM_IDLE and when the UE is in CM_CONNECTED. Referring to the section of the UE-triggered service request in 3GPP TS 23.502, the UE includes information indicating PDU session(s) to be activated in the service request message so that the UE informs the network of which service only or which PDU session only the UE will use. Then, the network may effectively determine which resources the network will allocate to the UE.

However, if the UE additionally transmits information about a PDU session that the UE desires to activate, upon transmitting the service request message, in order to prevent resources from being unnecessarily allocated by the network, this causes a problem that system load cannot be controlled from the perspective of the overall system. For example, assume a UE for which PDU session #1 and PDU session #2 are established. When the UE is in IDLE mode, data that the UE desires to transmit for PDU session #1 of the UE may occur. In this case, to transmit the data, the UE may request that the network activate PDU session #1 while transmitting the service request message to the network in order to establish a connection with the network. If resources are abundant in a system of the network, the network acknowledges the service request to activate PDU session #1 for the UE. However, data may additionally occur for PDU session #2 after PDU session #1 is activated. In this case, the UE may additionally transmit the service request message to the network and request activation for PDU session #2 through the service request message. However, if the network is lacking in available resources, the service request for activation of PDU session #2 will be denied by the network. In particular, when there has already been overload on the network, the additional service request by the UE causes a problem of further aggravating network load.

Accordingly, the present disclosure proposes a method of effectively controlling access to the network by the UE. According to the present disclosure, the load on the network may be reduced and resources of the network may be effectively used.

Figure 12:
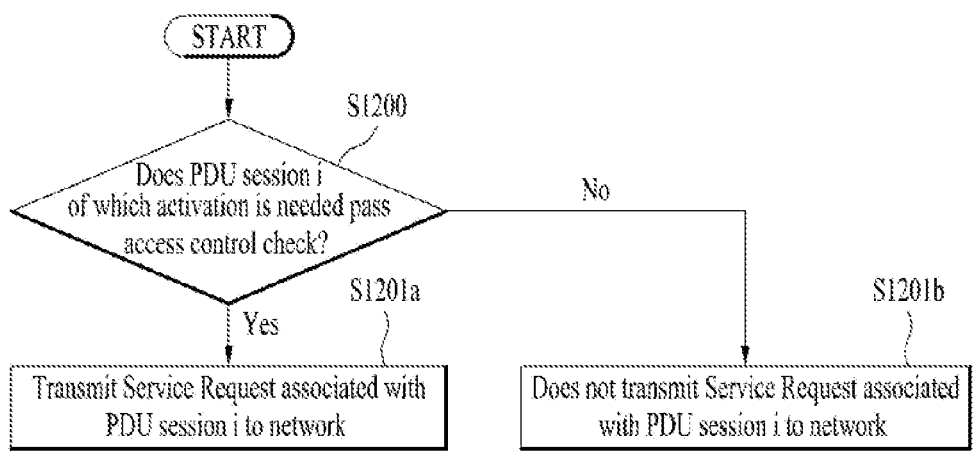
FIG. 12 illustrates a part of a service request procedure according to the present disclosure.

FIG. 12 illustrates a part of a service request procedure according to the present disclosure.

In the present disclosure, the network may provide information about a category criterion for access started by UE(s) and additionally transmit access control information suitable for each category criterion. If the UE should actually perform access to the network, the UE checks which category criterion an access attempt that the UE tries to perform satisfies and checks whether an access attempt suitable for the category criterion is allowed. If the check of whether the access attempt is allowed is passed, the UE actually attempts to access the network. In other words, the UE performs an access control check for access that the UE attempts to perform (i.e., checks whether the access attempt is allowed) and then transmits a service request for access to the network only after the access control check is passed. Referring to FIG. 12, in the present disclosure, whenever activation for any PDU session is needed, the UE checks whether an access attempt for the PDU session for which activation is needed is allowed (S1200). Alternatively, if activation for a PDU session needs to be requested, the UE checks whether an access attempt for each PDU session for which activation is to be requested is allowed (S1200) and transmits a service request including information about a PDU session that has passed the check of whether the access attempt is allowed (i.e., access control check) to the network (S1201*a*). In the LTE system, since the service request message is transmitted to transition to a CONNECTED state by a UE in an IDLE state, the message is transmitted only by the UE in the IDLE state. In addition, in the LTE system, the access control check has been performed by a UE that is in a state incapable of transmitting user data, i.e., by the UE in the IDLE state. In addition, if the access control check is passed, the UE transmits the service request, and the service request is accepted by the network, all PDN connections of the UE have been activated. Therefore, in the legacy communication system, a UE, a connection management state of which is CONNECTED, does not perform the access control check. However, according to the present disclosure, even when a connection management (CM) state of the UE is a connected state as well as when the UE is in an IDLE state in which there is no context of the UE to be transmitted by the UE to a BS and the UE cannot transmit any user data to the network, the UE performs the access control check for an inactive PDU session for which a user plane resource is not established even in a state similar to a CONNECTED state, in which a part of PDU sessions of the UE have already been activated and user data for the already activated PDU session may be transmitted to the network, the UE performs the access control check for a PDU session for which activation is needed because the user plane resource is not established.

For example, if the service request procedure is triggered, the UE forms the service request message and checks whether an access attempt for each PDU session for which activation is to be requested through a corresponding service request is allowed. As another example, in the case in which the UE should request that the network activate any PDU session, if the service request procedure is triggered for the PDU session, the UE checks whether the access attempt is allowed, and forms and transmits the service request message including information about the PDU session that has passed the check.

When the UE checks whether the access attempt for a PDU session for which activation is to be requested is allowed, a NAS layer of the UE uses access control information that the UE has transmitted in a cell in which the UE is actually located. The NAS layer of the UE requests that an RRC layer of the UE provide the access control information whenever the NAS layer of the UE checks whether the access attempt is allowed. Then, the RRC layer provides the NAS layer with the access control information received thereby from the cell, whenever the RRC layer receives the request for the access control information from the NAS layer.

As another method, the RRC layer of the UE attempts to receive system information transmitted in a cell in which the RRC layer is located and attempts to receive updated system information, whenever the access control information is updated and thus the system information is updated. Then, the RRC layer transmits the access control information received through the updated system information to the NAS layer of the UE. In this process, in order to reduce unnecessary signaling between the NAS layer and the RRC layer, the NAS layer may transmit, to the RRC layer, configuration information regarding whether to transmit the access control information to the NAS layer. That is, the RRC layer transmits the access control information to the NAS layer whenever new access control information is received, only when the NAS layer requests that the RRC layer transmit the access control information.

As still another method, the NAS layer of the UE does not directly check whether the access attempt is allowed.

Instead, the NAS layer may request that the RRC layer provide the access control information whenever the check of whether the access attempt is allowed is needed. When it is necessary to activate a PDU session, a NAS entity of the UE may recognize that the check of whether the access attempt for the PDU session is allowed is needed and transmit information indicating that the check of whether the access attempt for the PDU session is allowed is needed to the RRC layer of the UE. For example, when the NAS entity of the UE transmits the service request message to the RRC layer of the UE in order to activate any PDU session, the NAS entity of the UE informs the RRC layer of the information indicating that the check of whether the access attempt is allowed is needed, together with the service request message. Based on the information indicating that the check of whether the access attempt is allowed is needed, the RRC entity of the RRC layer checks whether the access attempt is allowed and transmits the service request message to the network when the check of whether the access attempt is allowed is passed. The NAS layer of the UE may further transmit information regarding which access control information the RRC layer of the UE should use. For example, the NAS layer of the UE transmits category information such as a characteristic or an access category of a PDU session for which activation is needed.

As another example, when activation of a PDU session is needed, the UE first checks whether the access attempt for the PDU session is allowed. That is, prior to generating a service request message including information about a PDU session for which activation is needed, the UE performs the access control check for the PDU session. The UE includes only information about a PDU session that has passed the check of whether the access attempt is allowed into the service request message to be transmitted. If a plurality of PDU sessions should be activated, the UE checks whether the access attempt for each of the PDU sessions is allowed. If all PDU sessions for which activation is needed do not pass the check of whether the access attempt is allowed, the UE aborts the service request procedure or does not transmit the service request message (S1201b).

Prior to describing examples of operations of the UE according to the present disclosure, a UE-triggered service request procedure of the 5G system will be described hereinbelow with reference to 3GPP TS 23.502. In the 5G system, a service request procedure is used by a UE in a CM_IDLE state to request an AMF to establish a secure connection or by a UE in a CM_CONNECTED state to request the AMF to establish user plane resources for PDU sessions. Specifically, the UE in CM_IDLE state initiates the service request procedure in order to transmit UL signaling messages, user data, or a response to a network paging request. After receiving the service request message, the AMF may perform authentication. After receiving the service request message, the AMF performs a security procedure. After establishment of a secure signaling connection to the AMF, the UE or the network may send a signaling message, e.g., a PDU session establishment request from the UE to the network or an SMF, via the AMF. The service request procedure may also be used by the UE in the CM_CONNECTED state to request establishment of user plane resources for PDU sessions. That is, the service request procedure may be used by the UE in the CM_CONNECTED state to request activation of a user plane connection for PDU sessions. For any service request, the AMF may respond with a response message to synchronize a PDU session status between the UE and the network. If the service request cannot be accepted by the network, the AMF may respond with a service reject message to the UE. For a service request due to user data, if establishment for user plane resources is not successful, the network may take further actions.

In the present disclosure, when there are PDU session(s) on which the UE is to request the network to perform activation, the UE in CM_IDLE performs an access control check for each PDU session to be activated (S1200). After performing the access control check, if there is a PDU session that has passed the access control check, the UE transmits an access network (AN) message to a (wireless) access network (e.g., BS) in order to transmit a service request message associated with the PDU session to the network (S1201a). The AN message comprises a NAS service request including information indicating PDU session(s) to be activated. The AN message may further include AN parameters, security parameters, PDU session status, etc. In the case of an NG-RAN, the AN parameters include an establishment cause and the establishment cause provides the reason why establishment of an RRC connection is required. In the case of the NG-RAN, the UE encapsulates a NAS service request message towards the AMF in an RRC message and transmits the RRC message to a radio access network (RAN). In the present disclosure, the UE identifies PDU session(s) to be activated in the NAS service request message. For example, the UE of the present disclosure includes information for identifying a PDU session that has successfully passed the access control check into the NAS service request message (S1201a). If the access control check for all PDU sessions to be activated fails, i.e., all PDU sessions for which activation is needed do not pass the access control check, the UE aborts a subsequent service request procedure or does not transmit the service request message (S1201b).

In the present disclosure, when there are PDU session(s) for which activation is needed, the UE in CM_CONNECTED performs the access control check for each PDU session for which activation is needed (S1200). After performing the access control check, if there is a PDU session that has passed the access control check, the UE transmits the NAS service request to the (R)AN (e.g., BS) in order to transmit the service request message associated with the PDU session to the network. The UE encapsulates the NAS service request message towards the AMF in the RRC message and transmits the RRC message to the RAN. In the present disclosure, the UE identifies PDU session(s) to be activated in the NAS service request message. For example, the UE of the present disclosure includes the information for identifying a PDU session that has successfully passed the access control check in the NAS service request message (S1201a). If the access control check for all PDU sessions to be activated fails, the UE aborts a subsequent service request procedure or does not transmit the service request message (S1201b).

For other details not described below in the steps of the service request procedure, reference may be made to each step of the UE-triggered service request procedure described in the section about the UE-triggered service request procedure in 3GPP TS 23.502:

- the UE performs the access control check per PDU session to be activated, i.e., per PDU session for which activation is needed;
- in the step of transmitting the service request message to the RAN by the UE, the information for identifying PDU session(s) that have successfully passed the access control check is included in the service request message; and/or if the access control check for all PDU session(s) to be activated fails, the UE aborts a subsequent service request procedure or does not transmit the service request message.

After establishment of a secure signaling connection to the AMF, the UE and the network may start establishment of user plane resources for a PDU session indicated in the service request message, i.e., activation of a user plane connection for the PDU session.

To distinguish between layers and maintain roles of the layers, the NAS layer may provide only necessary information to the RRC layer without performing the check of whether the access attempt is allowed. The check of whether the access attempt is allowed may be performed by the RRC layer. In this case, there may be a mismatch between information provided by the NAS layer and information used when the RRC layer checks whether the access attempt is allowed. For example, in order to request activation for PDU session 1 and PDU session 2, the NAS layer may form a service request message and transmit the service request message to the RRC layer. In order to cause the RRC layer to check whether the access attempt is allowed, the NAS layer may transmit information indicating that the check of whether the access attempt for PDU session 1 and PDU session 2 is allowed should be performed to the RRC layer, together with the service request message. Alternatively, the NAS layer may transmit information about an access category mapped to PDU layer 1 and information about an access category mapped to PDU session 2 to the RRC layer. The RRC layer will check whether the access attempt for each of PDU session 1 and PDU session 2 is allowed, based on the information received from the NAS layer. However, in the RRC layer, PDU session 1 may not pass the check of whether the access attempt is allowed and PDU session 2 may pass the check of whether the access attempt is allowed. In this case, if the RRC layer of the UE transmits the service request message received from the NAS layer, the network may activate both PDU session 1 and PDU session 2. To solve such a problem, the present disclosure proposes that the NAS layer request the RRC layer to check whether the access attempt is allowed if the service request procedure is triggered by the NAS layer. The NAS layer may transmit information necessary for the RRC layer to check whether the access attempt is allowed, e.g., network slice information, PDU information, traffic type information, etc. The RRC layer checks whether the access attempt is allowed based on the request and information received from the NAS layer and informs the NAS layer of the check result. If it is necessary to check whether the access attempt for various types of access categories is allowed, the RRC layer performs the check for each access category and informs the NAS layer of the check result. If the NAS layer of the UE receives the check result from the RRC layer of the UE and receives an indication of success for at least one check, the NAS layer transmits a NAS service request to the RRC layer and requests that the RRC layer transmit a service request message including the NAS service request to the network or establish an RRC connection. Although the access control check for an access category per PDU session to be activated is performed, if it is notified that the access control check for all PDU sessions fails, i.e., when it is notified that access attempts for all PDU sessions to be activated are barred, the NAS layer may attempt to again perform the service request procedure after a prescribed time.

While the present disclosure has been described based on a PDU session, the PDU session in the above description may be replaced with a network slice or network slice selection assistance information (NSSAI). That is, the present disclosure may be applied by replacing the case in which the PDU session needs to be connected with the case in which the network slice needs to be activated. Here, the NSSAI is a collection of single NSSAI (S-NSSAI). The S-NSSAI is used to uniquely identify the network slice and consists of a slice/service type (SST) and a slice differentiator (SD) (refer to 3GPP TS 23.501).

Figure 13:
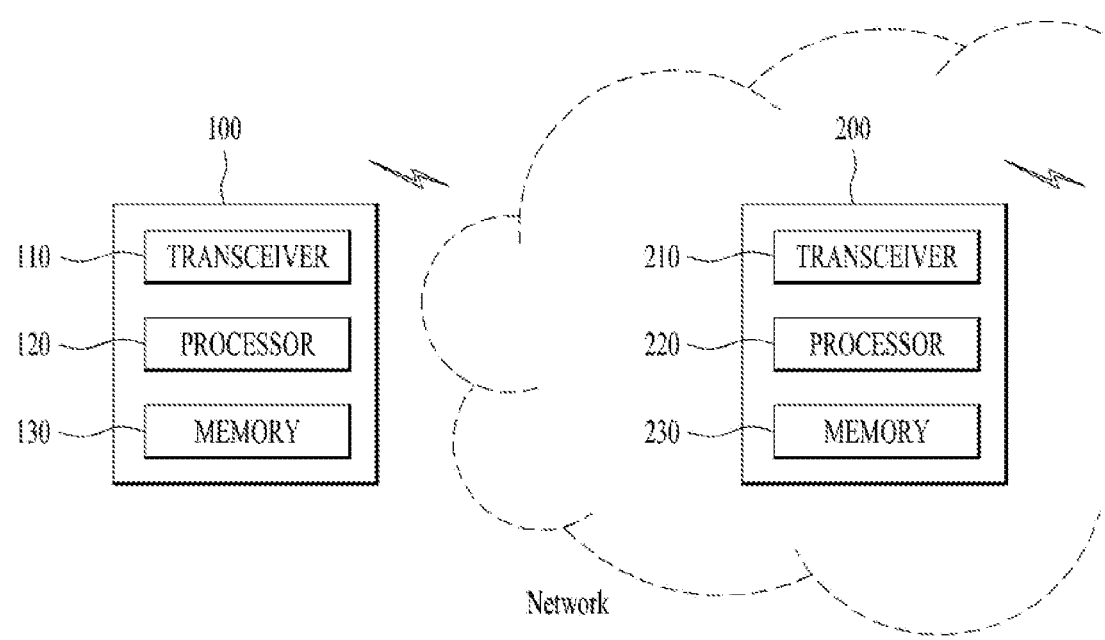
FIG. 13 illustrates a node device according to some examples of the present disclosure.

FIG. 13 illustrates configuration of a UE and a network node according to some examples of the present disclosure.

The UE 100 according to the present disclosure may include a transceiver 110, a processor 120, and a memory 130. The transceiver 110 of the UE 100 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the transceiver 110. The memory 130 may store the calculated and processed information for a predetermined time, and may be replaced by another constituent such as a buffer (not shown).

The network node 200 according to the present disclosure may include a transceiver 210, a processor 220 and a memory 230. If the transceiver communicates with a UE 100, the transceiver may be referred to as an RF unit or a transceiver. The transceiver 210 may be configured to transmit and receive various signals, data and information to and from an external device. The network node 200 may be connected to an external device by wire and/or wirelessly. The transceiver 210 may be embodied to be divided into a transmitter and a receiver. The processor 220 may control overall operation of the network node 200, and be configured to calculate and process information for the network node 200 to transmit and receive to and from the external device. In addition, the processor 220 may be configured to perform the proposed operations of the network node. According to the proposal of the present disclosure, the processor 220 may control the transceiver 210 to transmit data or a message to a UE or another network node. The memory 230 may store the calculated and processed information for a predetermined time, and may be replaced by another constituent such as a buffer (not shown). In an access network, the network node 200 may be an eNB or a gNB. In a core network, the network nodes 200 may be an AMF device with an access and mobility management function, an SMF device with a session management function, a UPF device with a user plane function, and so on, according to network functions.

For configuration of the UE 100 and the network apparatus 200, the details described in various examples of the present disclosure may be independently applied or implemented such that two or more examples are simultaneously applied. For simplicity, redundant description is omitted.

When it is necessary to activate an inactive PDU session indicating that a corresponding user plane connection is in an inactive state because a user plane resource among PDU sessions established for the UE is not established, the UE processor 120 may perform an access control check to check whether an access attempt for the PDU session is allowed. Determining that the access attempt for the PDU session is allowed through the access control check, the UE processor 120 may control the UE transceiver 110 to transmit a message including a service request for the PDU session.

The UE processor 120 may encapsulate the service request for the PDU session in an RRC message and control the UE transceiver 110 to transmit the RRC message including the service request to the network. For example, if UL user data associated with the inactive PDU session occurs, the UE processor 120 may be configured to request that a NAS layer of the UE activate the inactive PDU session. The UE processor 120 may be configured such that the NAS layer requests that the RRC layer of the UE perform the access control check for the inactive PDU session. The UE processor 120 may be configured such that the NAS layer provides information about the access control check for the inactive PDU session, e.g., an access category to which an access attempt for the inactive PDU session belongs, to the RRC layer. The UE processor 120 may be configured to cause the RRC layer to inform the NAS layer of the result of the access control check. If the RRC layer informs the NAS layer that the access attempt for the inactive PDU session is allowed, the UE processor 120 may cause the NAS layer to request that the RRC layer transmit a service request for activating the inactive PDU session. The RRC layer may generate an RRC message including the service request representing the inactive PDU session as a PDU session to be activated under control of the UE processor 120. The UE processor 120 may control the transceiver 110 to transmit the RRC message to the network.

Upon determining that the access attempt for the inactive PDU session is barred through the access control check, the UE processor 120 may not control the UE transceiver to transmit the service request for activating the inactive PDU session. For example, if the RRC layer of the UE performs the access control check for the inactive PDU session and informs the NAS layer of the UE that an access attempt for activating the inactive PDU session is barred as the result of the access control check, the UE processor 120 does not perform any further a process of transmitting the service request associated with the inactive PDU session to the network unless other resources occur.

The UE processor 120 of the present disclosure is configured to perform the access control check for the inactive PDU session when the inactive PDU session needs to be activated even though a connection mode of the UE is CM_CONNECTED in a core network and a part of PDU sessions of the UE has already been an activated state. The UE processor 120 may control modules in the UE such that the service request for the inactive PDU session may be transmitted or may not be transmitted according to the result of the access control check.

The examples of the present disclosure may be implemented through various means. For example, the examples of the present disclosure may be implemented by hardware, firmware, software, or a combination thereof.

When implemented by hardware, a method according to the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the examples of the present disclosure has been given to enable those skilled in the art to implement and practice the disclosure. Although the disclosure has been described with reference to exemplary examples, those skilled in the art will appreciate that various modifications and variations can be made in the present disclosure without departing from the spirit or scope of the disclosure described in the appended claims. Accordingly, the disclosure should not be limited to the specific examples described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the present disclosure is applicable to a millimeter wave (mmWave) communication system using an ultrahigh frequency band.

The invention claimed is:

1. A method performed by a user equipment (UE) in a wireless communication system, the method comprising:
   receiving, by the UE from a network, first information related to access control for each access category of a plurality of access categories;
   performing, by the UE, an access control check to determine whether an access attempt for the PDU session is allowed, based on the first information and a request to activate a protocol data unit (PDU) session; and
   transmitting, by the UE, to the network, a service request message for a UE-triggered service request procedure, based on the access attempt for the PDU session being allowed,
   wherein the service request message includes second information related to the PDU session to be activated.

2. The method of claim 1,
   wherein the determining whether the access attempt for the PDU session is allowed is performed by a radio access control (RRC) layer of the UE.

3. The method of claim 2, further comprising:
   providing, by a non-access stratum (NAS) of the UE, an access category of the PDU session to the RRC layer for determining whether the access attempt for the PDU session is allowed.

4. The method of claim 2, further comprising:
   informing, by the RRC layer, a non-access stratum (NAS) layer of the UE that the access attempt for the PDU session is allowed, based on a determination that the access attempt for the PDU session is allowed.

5. The method of claim 2, further comprising:
   not transmitting the service request message, based on a determination that the access attempt for the PDU session is barred.

6. The method of claim 1,
   wherein the service request message is encapsulated in a radio access control (RRC) message to be transmitted.

7. The method of claim 1,
   wherein the determining whether the access attempt for the PDU session is allowed is performed in a state in which the UE has at least one activated PDU session.

8. The method of claim 1,
wherein the UE is in a connected state.

9. A user equipment (UE) configured to operate in a wireless communication system, the UE comprising:
a transceiver,
a processor, and
a memory that is connectable to the processor and stores at least one program that, when executed, causes the processor to perform operations comprising:
receiving, by the UE from a network, first information related to access control for each access category of a plurality of access categories;
performing, by the UE, an access control check to determine whether an access attempt for the PDU session is allowed, based on the first information and a request to activate a protocol data unit (PDU) session; and
transmitting, by the UE, to the network, a service request message for a UE-triggered service request procedure, based on the access attempt for the PDU session being allowed,
wherein the service request message includes second information related to the PDU session to be activated.

10. The UE of claim 9,
wherein the determining whether the access attempt for the PDU session is allowed is performed by a radio access control (RRC) layer of the UE.

11. The UE of claim 10,
wherein the operations further comprise:
providing, by a non-access stratum (NAS) of the UE, an access category of the PDU session to the RRC layer for determining whether the access attempt for the PDU session is allowed.

12. The UE of claim 10,
wherein the operations further comprise:
informing, by the RRC layer, a non-access stratum (NAS) layer of the UE that the access attempt for the PDU session is allowed, based on a determination that the access attempt for the PDU session is allowed.

13. The UE of claim 10,
wherein the operations further comprise:
not transmitting the service request message, based on a determination that the access attempt for the PDU session is barred.

14. The UE of claim 9,
wherein the processor encapsulates the service request message in a radio access control (RRC) message and controls the transceiver to transmit the RRC message.

15. The UE of claim 9,
wherein the determining whether the access attempt for the PDU session is allowed is performed in a state in which the UE has at least one activated PDU session.

16. The UE of claim 9,
wherein the UE is in a connected state.

* * * * *

UNITED STATES PATENT AND TRADEMARK OFFICE
CERTIFICATE OF CORRECTION

| | | |
|---|---|---|
| PATENT NO. | : 11,330,499 B2 | Page 1 of 1 |
| APPLICATION NO. | : 16/637732 | |
| DATED | : May 10, 2022 | |
| INVENTOR(S) | : Sungduck Chun et al. | |

It is certified that error appears in the above-identified patent and that said Letters Patent is hereby corrected as shown below:

In the Claims

In Column 38, Lines 33:
Delete "mine whether an access attempt for the PDU session is" and insert --mine whether an access attempt for a protocol data unit (PDU) session is--

In Column 38, Lines 35:
Delete "activate a protocol data unit (PDU) session; and" and insert --activate the PDU session; and--

In Column 39, Lines 14:
Delete "mine whether an access attempt for the PDU session is" and insert --mine whether an access attempt for a protocol data unit (PDU) session is--

In Column 39, Lines 16:
Delete "activate a protocol data unit (PDU) session; and" and insert --activate the PDU session; and--

Signed and Sealed this
Twenty-first Day of March, 2023

*Katherine Kelly Vidal*

Katherine Kelly Vidal
*Director of the United States Patent and Trademark Office*